US010536936B2

(12) United States Patent
Park et al.

(10) Patent No.: US 10,536,936 B2
(45) Date of Patent: Jan. 14, 2020

(54) CONTROL INFORMATION TRANSMISSION METHOD AND APPARATUS FOR USE IN MOBILE COMMUNICATION SYSTEM

(71) Applicant: Samsung Electronics Co., Ltd., Suwon-si, Gyeonggi-do (KR)

(72) Inventors: Suyoung Park, Uiwang-si (KR); Suha Yoon, Seoul (KR); Euichang Jung, Seoul (KR); Sunghyuk Shin, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/452,009

(22) Filed: Mar. 7, 2017

(65) Prior Publication Data

US 2017/0265170 A1  Sep. 14, 2017

(30) Foreign Application Priority Data

Mar. 11, 2016 (KR) .................. 10-2016-0029720

(51) Int. Cl.
*H04W 72/04* (2009.01)
*H04W 84/12* (2009.01)

(52) U.S. Cl.
CPC .......... *H04W 72/042* (2013.01); *H04W 84/12* (2013.01)

(58) Field of Classification Search
CPC ..................... H04W 72/042; H04W 84/12
See application file for complete search history.

(56) References Cited

U.S. PATENT DOCUMENTS 9,774,436 B2 * 9/2017 Jeon ................ H04L 5/0062
2013/0078924 A1 * 3/2013 Choudhury ......... H04W 16/14
455/62

(Continued)

OTHER PUBLICATIONS

Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-speed Physical Layer in the 5 Ghz Band, IEEE Std 802.11a-1999 (Supplement to IEEE Std 802 11-1999), Sep. 16, 1999, p. 40, New York, NY.

(Continued)

*Primary Examiner* — Khaled M Kassim
*Assistant Examiner* — Saad A. Waqas
(74) *Attorney, Agent, or Firm* — Jefferson IP Law, LLP

(57) ABSTRACT

A method of control information transmission for a terminal in a mobile communication system, and an apparatus therefor are provided. In the method of control information transmission, the terminal acquires unlicensed frequency channel occupancy information based on the control information received from a base station and transmits the unlicensed frequency channel occupancy information to other terminals operating on the same unlicensed frequency. The method of control information transmission includes receiving a first control information from a base station using a first radio communication protocol, acquiring channel occupancy information based on the first control information, and transmitting a second control information including the channel occupancy information to another terminal using a second radio communication protocol.

8 Claims, 23 Drawing Sheets

(56) References Cited

U.S. PATENT DOCUMENTS

| 2015/0215100 | A1 | 7/2015 | Jeon et al. | |
|---|---|---|---|---|
| 2015/0223075 | A1 | 8/2015 | Bashar et al. | |
| 2015/0223244 | A1 | 8/2015 | Tabet et al. | |
| 2016/0073344 | A1* | 3/2016 | Vutukuri | H04W 52/0216 370/252 |
| 2016/0135172 | A1* | 5/2016 | Sun | H04L 5/0007 370/329 |
| 2016/0142192 | A1* | 5/2016 | Damnjanovic | H04W 74/0816 370/329 |
| 2016/0227578 | A1* | 8/2016 | Lee | H04W 74/004 |
| 2016/0337904 | A1* | 11/2016 | Hsu | H04W 28/12 |
| 2017/0353962 | A1 | 12/2017 | Gao | |
| 2017/0359850 | A1* | 12/2017 | Loehr | H04W 76/048 |

OTHER PUBLICATIONS

Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band, IEEE Std 802.11b-1999 (R2003) (Supplement to ANSI/IEEE Std 802 11, 1999 Edition), Sep. 16, 1999, p. 29, New York, NY.

IEEE Standard for Information technology—Telecommunications and information exchange between systems Local and metropolitan area networks—Specific requirements—Part 11: Wireless LAN Medium Access Control (MAC) and Physical Layer (PHY) Specifications, IEEE Std 802.11™-2012 (Revision of IEEE Std 802.11-2007), Mar. 29, 2012, p. 1761, New York, NY.

* cited by examiner

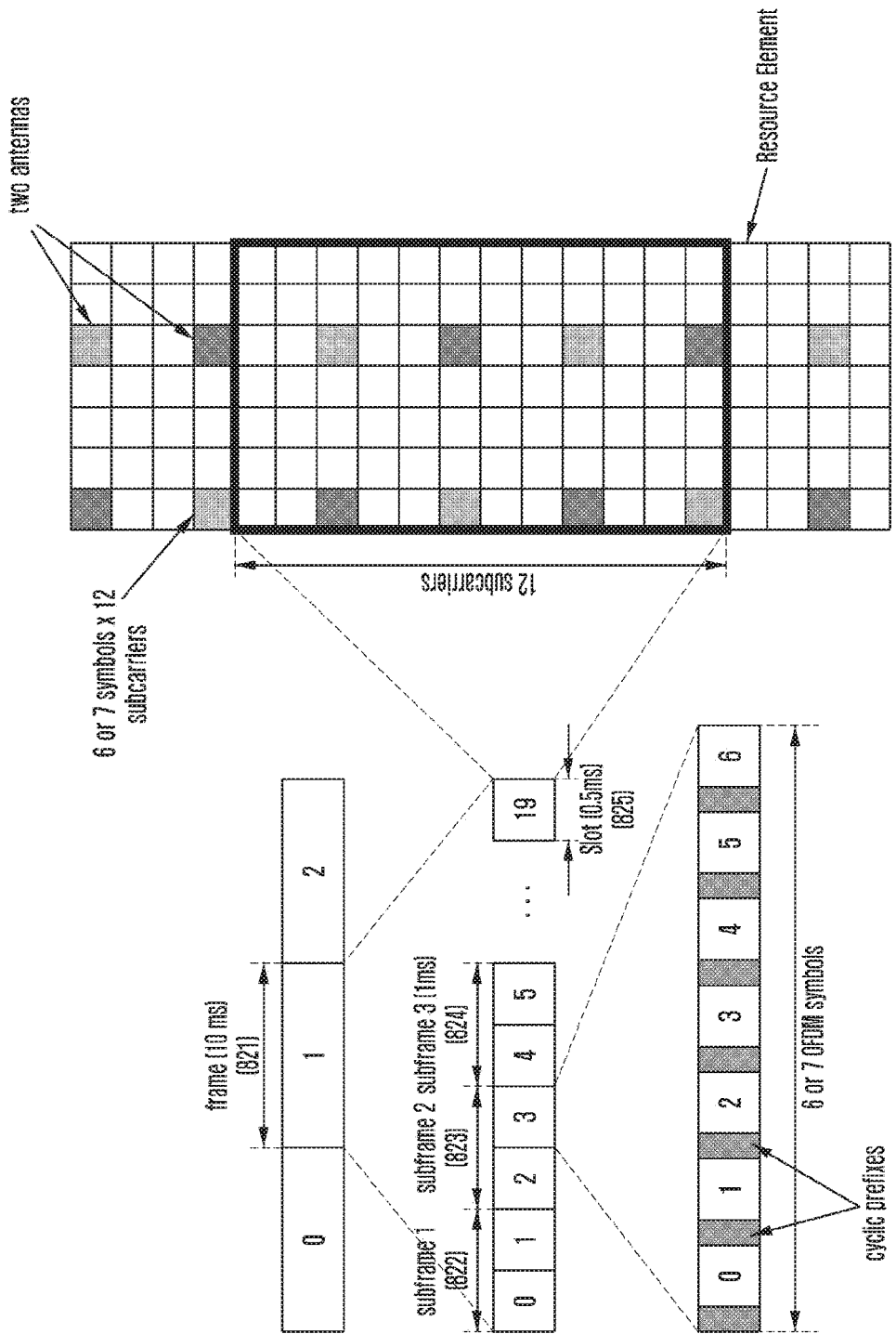

CONTROL INFORMATION TRANSMISSION METHOD AND APPARATUS FOR USE IN MOBILE COMMUNICATION SYSTEM

CROSS-REFERENCE TO RELATED APPLICATION(S)

This application claims the benefit under 35 U.S.C. § 119(a) of a Korean patent application filed on Mar. 11, 2016 in the Korean Intellectual Property Office and assigned serial number 10-2016-0029720, the entire disclosure of which is hereby incorporated by reference.

TECHNICAL FIELD

The present disclosure relates to a method for a terminal to acquire unlicensed frequency channel occupancy information based on the control information received from a base station and to transmit the unlicensed frequency channel occupancy information to other terminals operating on the same unlicensed frequency.

BACKGROUND

Mobile communication systems were developed to provide the subscribers with voice communication services on the move. Although the mobile communication systems have evolved recently to the level of supporting high speed data communication services beyond the early voice-oriented services, resource shortages and user requirements for higher speed services are spurring evolution towards increasingly more advanced mobile communication systems.

Meanwhile, unlike voice services, data services are provided using the resources determined based on transmit data amount and channel condition. Accordingly, a wireless communication system, particularly a cellular communication system, is provided with a scheduler, which takes charge of resource allocation in consideration of the required resource amount, channel condition, data amount, etc. Typically, in most cellular communication systems the scheduler is located in base stations for radio resource management, and this is the case even in the long-term evolution (LTE) system as one of the next generation mobile communication systems.

Recently, a technique called licensed assisted access (LAA) has been proposed to improve frequency utilization efficiency by using carrier aggregation (CA) across licensed and unlicensed bands.

In an LTE system operating on a licensed band frequency, the frequency owner may use the frequency resources exclusively in the way as intended. In the case of the communication devices operating in an unlicensed band, however, they have to share a channel in the unlicensed band; thus, there is a need of a method for sharing the channel without collision. Listen before talk (LBT) is a technique for sensing a radio channel and, if the channel is not in use, starting transmission. Here, the operation of determining whether the channel is occupied by another communication device is called channel sensing or clear channel assessment (CCA).

In an LAA system, an LAA communication-enabled terminal may collect channel occupancy information including unlicensed frequency channel occupancy and channel occupancy time that are determined based on the control information received from a base station. However, certain terminals (e.g., LAAs that cannot decode the control information and wireless local area network (WLAN) terminals) cannot check the channel occupancy information contained in the control information transmitted by the base station. Accordingly, if there is any terminal performing Wi-Fi communication around the LAA terminal being served by an LAA base station, the neighboring Wi-Fi terminal is likely to cause interference to the LAA communication of the LAA terminal, i.e., hidden node problem.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a channel occupancy notification method and apparatus of a terminal operating on an unlicensed frequency that is capable of transmitting channel occupancy information acquired based on the control information transmitted by a terminal to other terminals operating on the unlicensed frequency.

In accordance with an aspect of the present disclosure, a method of a control information transmission of a terminal is provided for use in a mobile communication system. The control information transmission method includes receiving a first control information from a base station using a first radio communication protocol, acquiring channel occupancy information based on the first control information, and transmitting a second control information including the channel occupancy information to another terminal using a second radio communication protocol.

In accordance with another aspect of the present disclosure, a terminal for receiving control information is provided for use in a mobile communication system. The terminal includes a first communication interface configured to perform a first communication using a first radio communication protocol, a second communication interface configured to perform a second communication using a second radio communication protocol, and at least one processor configured to control the first communication interface to receive first control information from a base station, acquire channel occupancy information based on the first control information, and control the second communication interface to transmit a second control information including the channel occupancy information to another terminal using the second radio communication protocol.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 8B is a diagram illustrating a structure of a radio frame for explaining control information carried in units of a subframe according to an embodiment of the present disclosure;

Throughout the drawings, like reference numerals will be understood to refer to like parts, components, and structures.

DETAILED DESCRIPTION

Figure 1:
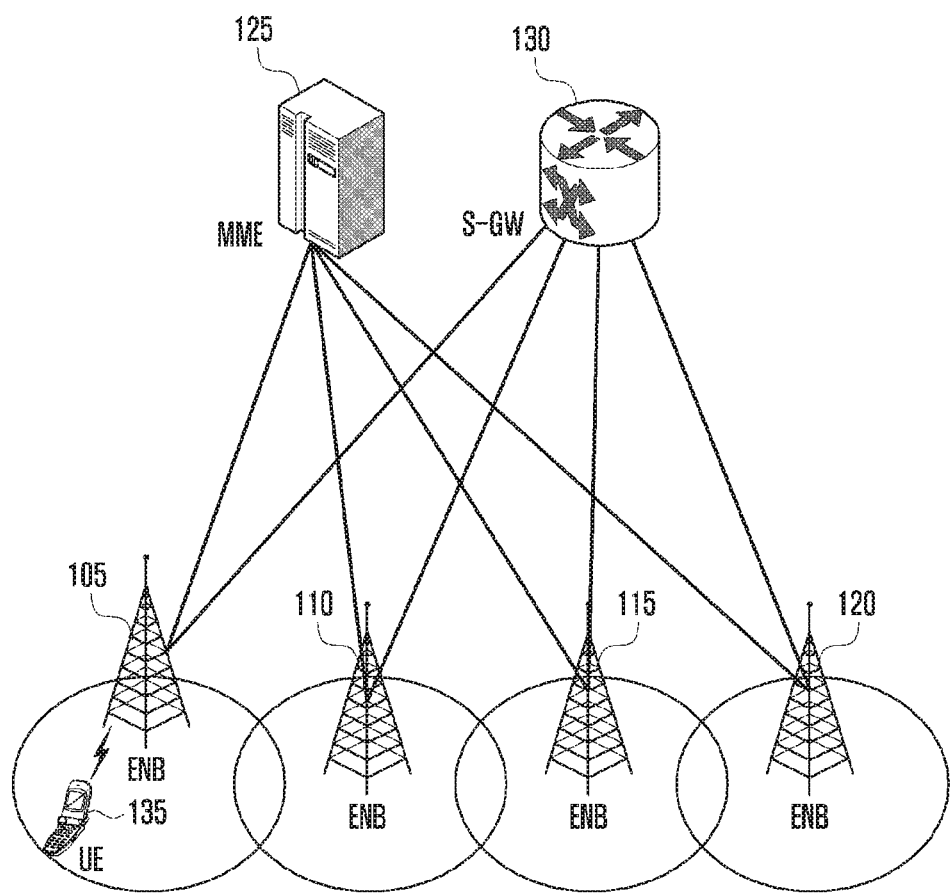
FIG. 1 is a diagram illustrating a long-term evolution (LTE) system architecture according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, some elements are exaggerated, omitted, or simplified in the drawings and, in practice, the elements may have sizes and/or shapes different from those shown in the drawings. The same reference numbers are used throughout the drawings to refer to the same or like parts.

Advantages and features of the present disclosure and methods of accomplishing the same may be understood more readily by reference to the following detailed description of various embodiments and the accompanying drawings. The present disclosure may, however, be embodied in many different forms and should not be construed as being limited to the various embodiments set forth herein. Rather, these various embodiments are provided so that this disclosure will be thorough and complete and will fully convey the concept of the disclosure to those skilled in the art, and the present disclosure will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus to produce a machine, such that the instructions which are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce an article of manufacture including instruction means which implement the function/act specified in the flowcharts and/or block diagrams. The computer program instructions may also be loaded onto a computer or other programmable data processing apparatus to cause a series of operations to be performed on the computer or other programmable apparatus to produce a computer implemented process such that the instructions which are executed on the computer or other programmable apparatus provide operations for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or may be performed in reverse order according to their functions.

The term "module" according to the various embodiments of the present disclosure, means, but is not limited to, a software or hardware component, such as a field programmable gate array (FPGA) or application specific integrated circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more central processing units (CPUs) in a device or a secure multimedia card.

FIG. 1 is a diagram illustrating a long-term evolution (LTE) system architecture according to an embodiment of the present disclosure.

Referring to FIG. 1, the radio access network (RAN) of the LTE system includes evolved node Bs (eNBs) 105, 110, 115, and 120; a mobility management entity (MME) 125; and a serving gateway (S-GW) 130. The user equipment (UE) 135 connects to an external network via the eNBs 105, 110, 115, and 120 and the S-GW 130.

The eNBs 105, 110, 115, and 120 are equivalent to the legacy node Bs of the universal mobile telecommunications system (UMTS). The UE 135 connects to one of the eNBs via a radio channel, and the eNB has more control functions than the legacy node B. In the LTE system, all user traffic including real time services such as voice over IP (VoIP) is served through a shared channel; thus, there is a need of an entity capable of collecting per-UE state information (such as buffer status, allowed transmission power state, and channel status) and scheduling the UEs based on the state information, and the eNBs 105, 110, 115, and 120 are responsible for these functions. Typically, one eNB has multiple cells. The LTE system adopts orthogonal frequency division multiplexing (OFDM) as a radio access technology in order to secure a data rate of up to 100 Mbps with a bandwidth of 20 MHz. The LTE system also adopts adaptive modulation and coding (AMC) to determine the modulation scheme and channel coding rate in adaptation to the channel condition of the UE. The S-GW 130 is an entity that provides data bearers to establish and release data bearers under the control of the MME 125. The MME 125 is responsible for various control functions and maintains connections with a plurality of eNBs.

Figure 2:
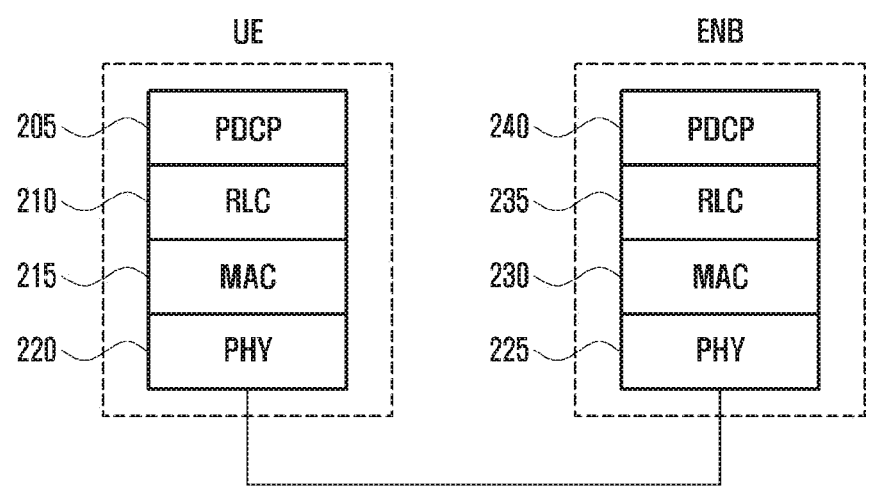
FIG. 2 is a diagram illustrating a protocol stack of an interface between a user equipment (UE) and an evolved nodeB (eNB) in the LTE system according to an embodiment of the present disclosure.

FIG. 2 is a diagram illustrating a protocol stack of an interface between a UE and an eNB in the LTE system according to an embodiment of the present disclosure.

Referring to FIG. 2, the protocol stack of the interface between the UE and the eNB in the LTE system includes a plurality of protocol layers stacked from the bottom to the top with a physical layer (PHY) denoted by reference numbers 220 and 225, medium access control (MAC) layer denoted by reference numbers 215 and 230, radio link control (RLC) layer denoted by reference numbers 210 and 235, and packet data convergence control (PDCP) layer denoted by reference numbers 205 and 240. The PDCP layer denoted by reference numbers 205 and 240 takes charge of compressing/decompressing an IP header. The RLC layer denoted by reference numbers 210 and 235 takes charge of segmenting a PDCP packet data unit (PDU) into segments of appropriate size. The MAC layer denoted by reference numbers 215 and 230 allows for connection of multiple RLC entities and takes charge of multiplexing RLC PDUs from the RLC layer into a MAC PDU and demultiplexing a MAC PDU into RLC PDUs. The PHY layer denoted by reference numbers 220 and 225 takes charge of channel-coding and modulation on higher layer data to generate and transmit OFDM symbols over a radio channel, and demodulating and channel-decoding on OFDM symbols received over the radio channel to deliver the decoded data to the higher layers. The PHY layer denoted by reference numbers 220 and 225 uses hybrid automatic repeat request (HARQ) for additional error correction by transmitting 1-bit information indicating positive or negative acknowledgement about data packets, the acknowledgement being transmitted from the receiver to the transmitter. The 1-bit information is referred to as acknowledgement/negative acknowledgement (ACK/NACK).

Figure 3:
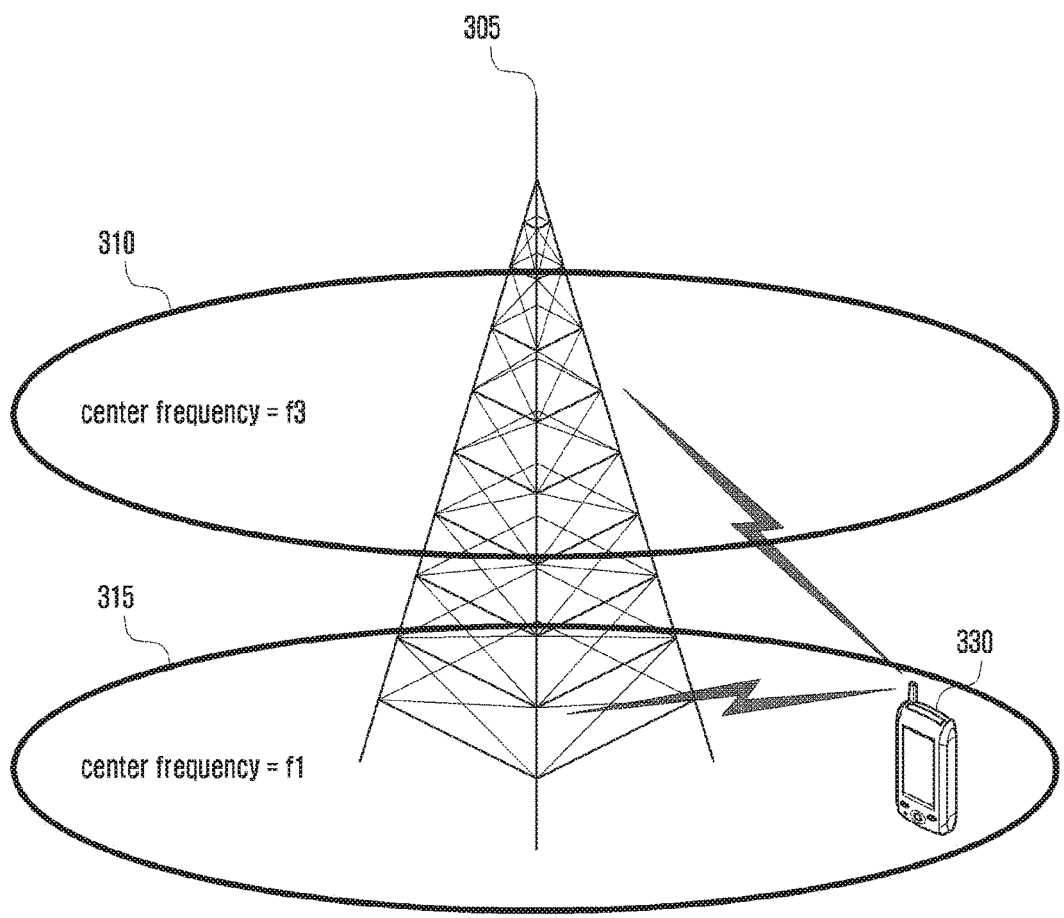
FIG. 3 is a diagram illustrating a concept of carrier aggregation (CA) for a UE according to an embodiment of the present disclosure.

FIG. 3 is a diagram illustrating a concept of carrier aggregation (CA) for a UE according to an embodiment of the present disclosure.

Referring to FIG. 3, an eNB transmits and receives signals through multiple carriers across a plurality of frequency bands. For example, when the eNB 305 is configured to use the downlink carrier 315 with center frequency f1 and the downlink carrier 310 with center frequency f3, the UE 330 may receive data on one of the two carriers according to the related art.

However, a CA-enabled UE is capable of transmitting/receiving data on multiple carriers simultaneously.

Meanwhile, an LAA system is capable of aggregating licensed and unlicensed frequency bands for data communication between an eNB and a UE. Accordingly, a CA-enabled UE is capable of transmitting and receiving data through licensed and unlicensed band carriers simultaneously. With the capability of aggregating the licensed and unlicensed band carriers, it is possible to improve data transmission efficiency.

Figure 4:
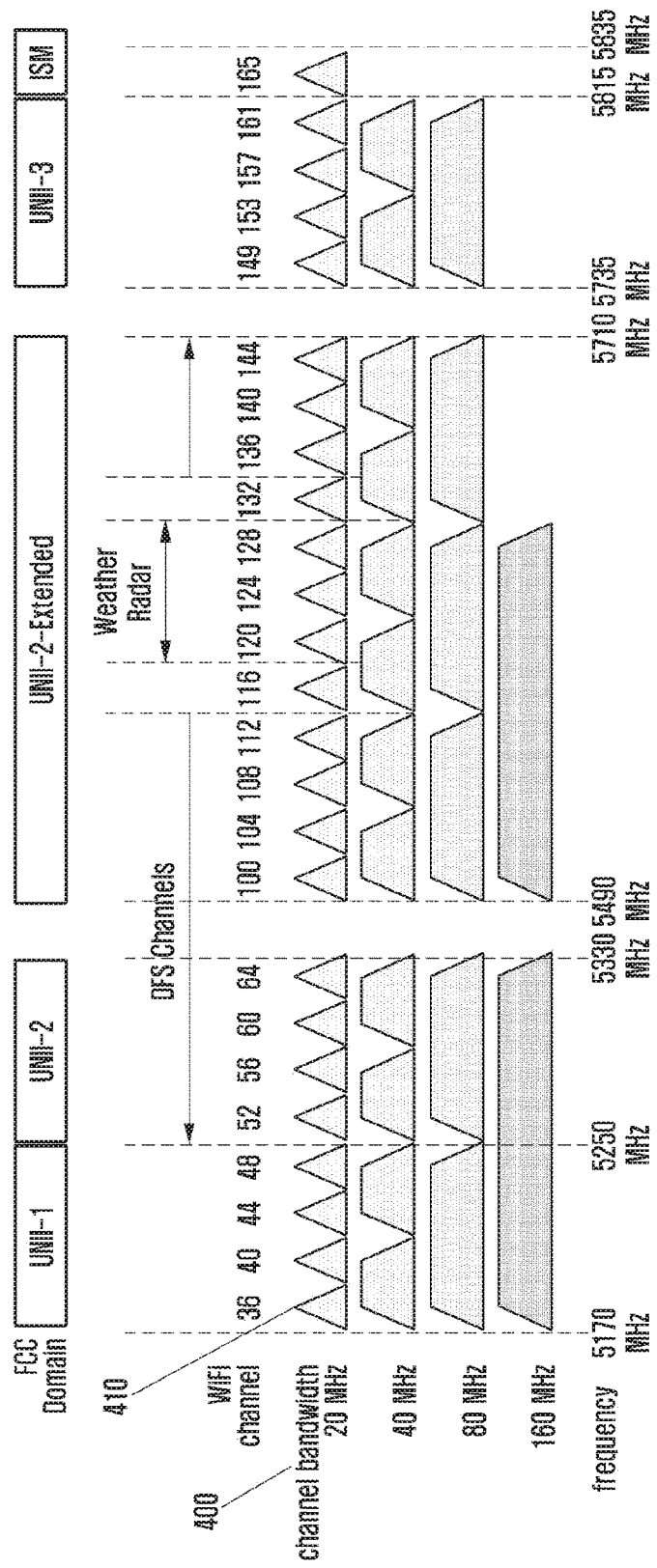
FIG. 4 is a diagram illustrating a configuration of channels in an unlicensed frequency band according to an embodiment of the present disclosure.

FIG. 4 is a diagram illustrating a configuration of channels in an unlicensed frequency band according to an embodiment of the present disclosure.

In many countries, a bandwidth of about 500 MHz is allocated for unlicensed purposes in the 5 GHz frequency band.

Referring to FIG. 4, the bandwidth of about 500 MHz consists of 25 carriers 410 with 20 MHz bandwidth 400. The use of unlicensed band carriers can further increase carrier aggregation capability of the current LTE standard, which supports carrier aggregation up to 32 licensed band carriers.

Figure 5:
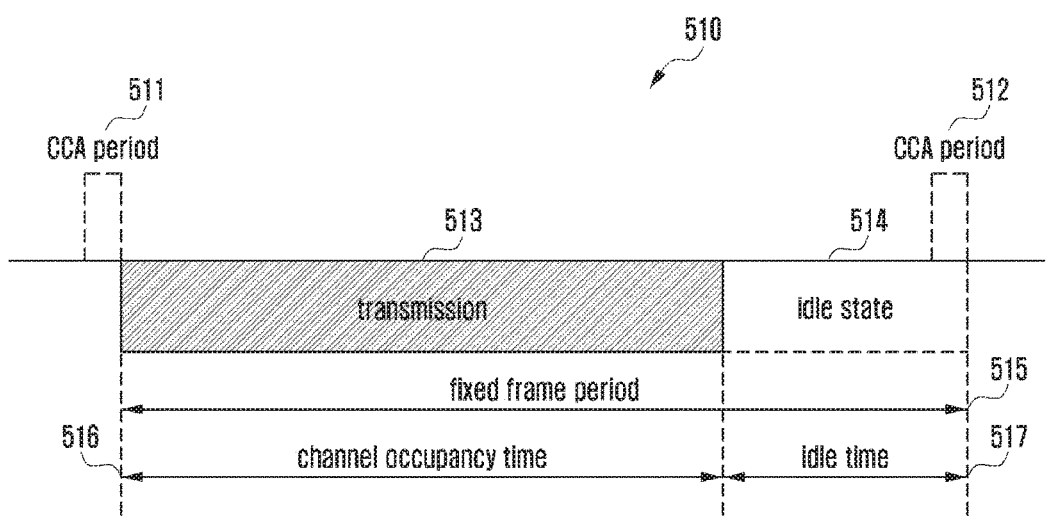
FIG. 5 is a diagram illustrating a concept of channel occupancy determination in a licensed assisted access (LAA) system according to an embodiment of the present disclosure.

FIG. 5 is a diagram illustrating a concept of channel occupancy determination in an LAA system according to an embodiment of the present disclosure.

In a communication system operating in a licensed frequency band such as an LTE system, the frequency owner may use the licensed frequency resources exclusively in a way as intended. However, communication devices operating on an unlicensed frequency band have to measure frequency channel occupancy for sharing and using the channel without collision. Here, the operation of determining whether the corresponding frequency channel is occupied by another communication is called clear channel assessment (CCA) or channel sensing.

The diagram 510 of FIG. 5 is provided to explain how an eNB or a UE makes a determination on unlicensed band channel occupancy for transmission of data. The eNB or the UE may perform CCA during a CCA period 511 to determine whether the unlicensed frequency is preoccupied. The CCA period 511 may be equal to or greater than a predetermined time (e.g., 20 μs).

In an embodiment of the present disclosure, it is assumed that a UE performs channel sensing to determine whether the unlicensed frequency band is occupied. The UE may measure energy in the unlicensed frequency band to determine whether the unlicensed frequency band is occupied. If the measured energy level is equal to or less than a predetermined threshold level, the UE determines non-occupancy and transmits data in the unlicensed band as denoted by reference number 513. Here, the time period in which the UE transmits data is referred to as channel occupancy time 516.

The UE occupies the unlicensed band during a minimum 1 ms up to 10 ms for CCA and then has to stay in an idle state 514, as long as a minimum 5% of the channel occupancy time 516, without transmission. This period of the idle state is referred to as idle period as denoted by reference number 517. A fixed frame period 515 includes the channel occupancy time 516 and the idle time 517, and the idle time 517 may include CAA period 512, as illustrated in FIG. 5.

Alternatively, if the energy level is greater than the threshold level, the UE decodes the control information received from the eNB to determine whether the unlicensed frequency band is occupied and, if so, checks the channel occupancy time.

The UE may check the channel occupancy time based on the control information received from an LTE eNB. The control information from the LTE eNB may be transmitted through a control channel (e.g., physical downlink control channel (PDCCH)). In this case, only the UEs camped on the corresponding LTE eNB can decode the control information received through the PDCCH and, if allocated radio resources during the corresponding time period, the UE can check the channel occupancy time based on the control information.

Figure 6A:
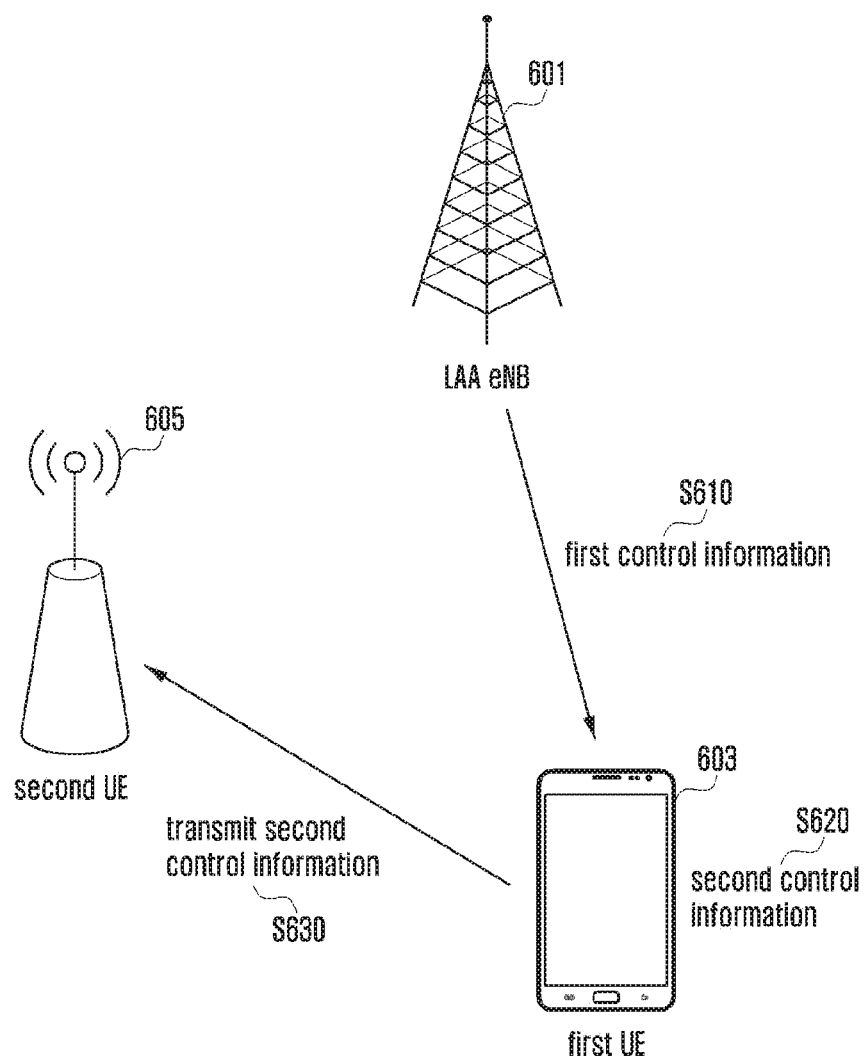
FIG. 6A is a diagram illustrating a network environment according to an embodiment of the present disclosure.

FIG. 6A is a diagram illustrating a network environment according to an embodiment of the present disclosure.

Referring to FIG. 6A, the network according to an embodiment of the present disclosure includes an eNB 601, a first UE 603, and a second UE 605. In this embodiment, the eNB 601 may be an LTE eNB or an LAA eNB. This embodiment is directed to a case where the first UE 603 is an LAA UE capable of operating on both the licensed and unlicensed frequencies, and the second UE 605 is a WLAN UE (which is interchangeably referred to as WLAN device or WLAN station) operating on only the unlicensed frequency. However, the present disclosure is not limited to this embodiment, and it is also applicable to the case where both the first and second UEs 603 and 605 are LAA UEs. Here, the WLAN may include radio communication sub-systems and Wi-Fi radio systems operating with WLAN protocols including, but not limited to, institute of electrical and electronics engineers (IEEE) 802.11a, IEEE 802.11b, IEEE 802.11g, IEEE 802.11-2007, IEEE 802.11n, IEEE 802.11-12, and IEEE 802.11ac.

The eNB 601 may transmit a first control information to the first UE 603 at operation S610.

If the eNB 601 is transmitting data packets on the unlicensed frequency (hereinafter, an eNB's data packet transmission over an unlicensed frequency band may be interchangeably referred to as LAA transmission), this means that the UE for which the data packets are destined has preoccupied the unlicensed frequency; thus, other UEs (the first and second UEs in this embodiment) cannot transmit data over the corresponding unlicensed frequency.

In this case, the first control information transmitted from the eNB 601 to the first UE at operation S610, may include the information pertaining to LAA transmission. At this time, the LAA transmission information may be equivalent to unlicensed frequency band channel occupancy information and thus, hereinafter, is referred to interchangeably as channel occupancy information.

If the first control information is received, the first UE may check the unlicensed frequency band channel occupancy information contained in the first control information.

However, only the UEs camped on the eNB (the first UE in this embodiment) can decode the first control information to check the channel occupancy information as described above, and the second UE cannot check the channel occupancy information. Here, the second UE is the WLAN UE capable of performing WLAN communication over the unlicensed frequency band as described above. However, the second UE may be an LAA UE capable of performing communication over the unlicensed frequency band.

The first UE 603 may generate a second control information based on the first control information at operation S620. For example, the first UE 603 may generate the second control information including the channel occupancy information carried in the first control information.

Next, the first UE 603 may transmit the second control information to the second UE 605 at operation S630.

The second control information may be the control information being transmitted through WLAN communication using a WLAN protocol and carried in a clear-to-send (CTS) packet. The first UE 603 may transmit the second control information to the second UE 605 using a WLAN protocol.

This means that a WLAN UE or an LAA UE can receive the second control information using the WLAN protocol.

Upon receipt of the second control information, the second UE 605 may check the channel occupancy time based on the channel occupancy information contained in the second control information to control its data transmission over the corresponding channel. If the UE that has received the second control information is a WLAN UE, the WLAN UE checks the preoccupancy of the channel during the channel occupancy time and performs a predetermined operation for the corresponding situation. The predetermined operation may be an operation specified in a WLAN communication standard. In an embodiment, the WLAN UE may stop the channel sensing operation during the channel occupancy time.

Figure 6B:
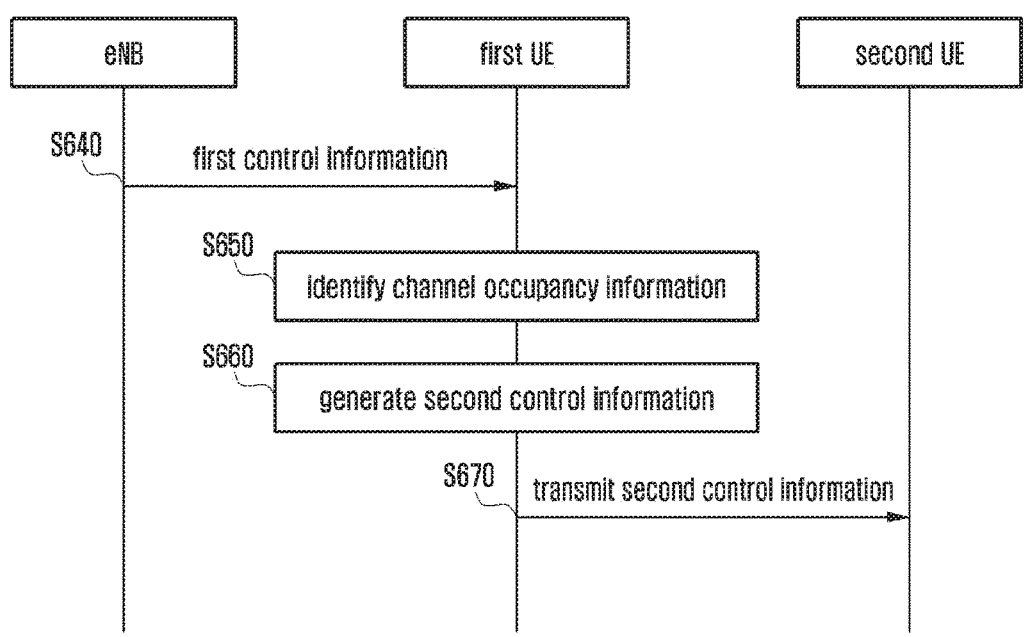
FIG. 6B is a signal flow diagram illustrating a control information transmission method of a UE according to an embodiment of the present disclosure.

FIG. 6B is a signal flow diagram illustrating a control information transmission method of a UE according to an embodiment of the present disclosure.

Referring to FIG. 6B, the eNB may transmit first control information to the first UE at operation S640. The first control information may include scheduling information for resource allocation to the UE for downlink data transmission. The first control information may also include scheduling information for resource allocation to the UE for uplink data transmission. In the present disclosure, the resource allocation information and the scheduling information may be used interchangeably with the same meaning. The first control information may check the downlink and uplink data transmission resources based on the first control information.

If it is determined that another UE is transmitting packets in the unlicensed frequency band, the eNB may include the channel occupancy information pertaining to the corresponding unlicensed frequency band in the first control information.

Upon receipt of the first control information, at operation S650 the first UE may identify the channel occupancy information contained in the first control information. That is, the first UE may check the channel occupancy information including the channel occupancy time during which the eNB transmits packets in the unlicensed frequency band.

If the channel occupancy information is received, at operation S660 the first UE may generate second control information including the channel occupancy information to other UEs.

The second control information may be the control information transmitted using a WLAN protocol, e.g., the control information contained in a request-to-send (RTS) or clear-to-send (CTS) packet. That is, the first UE may generate an RTS or CTS packet having a field containing the channel occupancy information. However, the present disclosure is not limited thereto.

Next, the first UE may transmit the second control information to the second UE at operation S670. The second control information may be transmitted from the first UE to the second UE using a WLAN protocol. In the embodiment, there may be at least one second UE that is capable of receiving the second control information to identify the channel occupancy information.

Upon identifying the channel occupancy information contained in the second control information, the second UE may stop transmitting data during the channel occupancy time. The second UE may also stop the channel sensing operation for data transmission.

Figure 7:
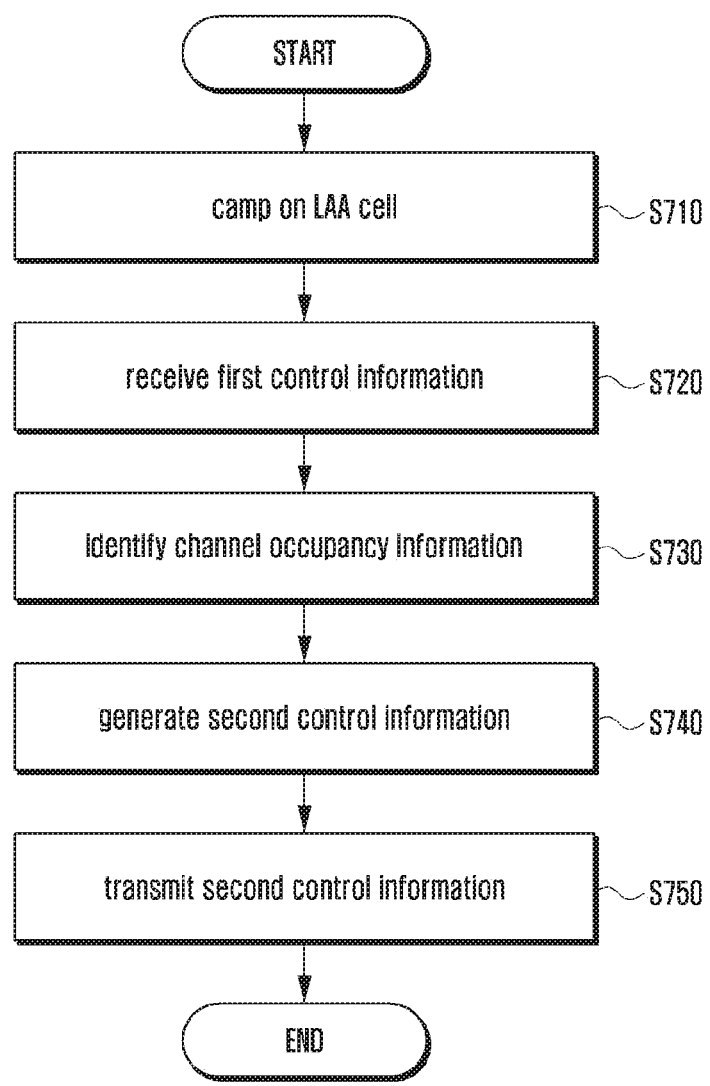
FIG. 7 is a flowchart illustrating a control information transmission method of a UE according to an embodiment of the present disclosure.

FIG. 7 is a flowchart illustrating a control information transmission method of a UE according to an embodiment of the present disclosure.

Referring to FIG. 7, the UE may camp on a cell of an eNB (hereinafter, referred to as LAA cell) at operation S710.

An LAA system is the system capable of supporting carrier aggregation across licensed and unlicensed bands to improve frequency utilization efficiency and downlink throughput, and an LAA cell can be used as a secondary cell (SCell). That is, the UE may configure the LAA cell as an SCell.

A description is made hereinafter of the procedure for a UE to camp on a cell.

A UE camped on a primary cell (PCell) may transmit UE capability information to an eNB through the PCell. The UE capability information may include CA combinations available for the UE. The available CA combinations may include combinations of LAA frequency bands (i.e., LAA combinations). Accordingly, if the UE capability information is received, the eNB may select a SCell that can be configured in addition to the PCell based on the frequency band combinations and transmit the information on the SCell information to the UE. The selected SCell information may include a frequency band combination for LAA (i.e., LAA combination). If the SCell information is received, the UE may camp on the SCell indicated by the SCell information while maintaining the camp-on state to the PCell.

Also, the SCell information may include information on the frequency of the SCell and it may be expressed as shown in Table 1.

TABLE 1

DL-DCCH-Message
  rrcConnectionReconfiguration
    rrcConnectionReconfiguration (0) DL-DCCH Message =
      message = c1 = rccConnectionReconfiguration =
        rrc-Transactionidentifier = 0
        criticalExtensions = c1 = rrcConnectionReconfiguration - r8 =
          measConfig =
            measObjectToAddModList = SEQUENCE OF
            MeasObjectToAddMod
              MeasObjectToAddMod (1) =
                measObjectid = 1
                measObject = measObjectEUTRA =
                  carrierFreq = 3100
                  allowedMeasBandwidth = mbw25

After configuring the LAA as an SCell, the UE may change the setting of a WLAN module of the UE based on the frequency information of the SCell. The UE may change the SCell frequency information for a WLAN frequency information such that the WLAN module operates on the WLAN frequency based on the changed frequency information.

For example, if the LAA module and the WLAN module of the UE use one antenna, the antenna may be configured to operate on the frequency of the LAA cell to camp on the LAA cell and, in this case, it is not necessary for the UE to change the setting of the WLAN module. Otherwise, if the LAA module and the WLAN module use respective antennas, the UE may change the frequency configuration of the antenna in use by the WLAN module according to the frequency information of the LAA cell SCell. Alternatively, the UE may configure the front-end of the WLAN module according to the frequency information of the LAA cell. If there is data to transmit by means of the WLAN module, the UE may configure the antenna and front-end of the WLAN module regardless of the frequency information of the LAA cell.

In an embodiment, the control information transmission method may include identifying a transmission rate of the channel corresponding to the frequency information of the WLAN module. The transmission rate of the channel may be used as the information for calculating a CTS or RTS packet transmission timing of the WLAN module.

Next, the UE may receive the first control information from the eNB at operation S720. If it has data to transmit to the UE, the eNB may transmit the first control information to the UE through the PCell or the SCell. Here, the first control information may include channel occupancy information.

The eNB may transmit the first control information including the unlicensed frequency band channel occupancy information using one of three methods as follows.

The first method is to transmit channel occupancy information for the SCell through the PCell, i.e., in the control information for the PCell. The second method is to transmit control information for the SCell that includes unlicensed frequency band channel occupancy information through the PCell (in a way similar to the cross-carrier scheduling of LTE). The third method is to transmit control information for the SCell that includes unlicensed frequency band channel occupancy information through the SCell.

The first control information may include resource allocation information for downlink data transmission. That is, the first control information may be downlink control information (DCI) containing the scheduling information. In the case of using DCI, the eNB may configure the DCI in a predefined DCI format having a field containing the channel occupancy information. It may also be possible to define a new field for indicating the channel occupancy information in a predetermined DCI format for use by the eNB.

The UE may receive the first control information through a control channel, a data channel, or a separately defined channel, and a detailed description thereof is made hereinafter with reference to FIG. 8A.

Figure 8A:
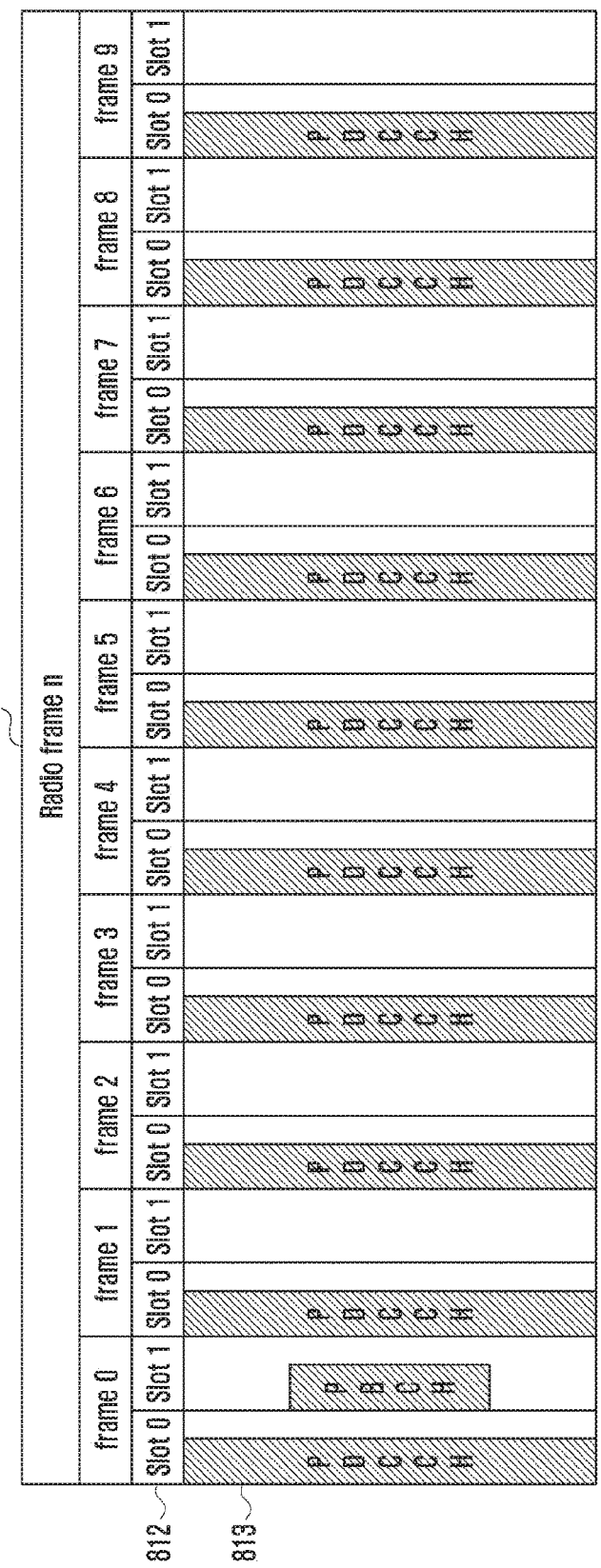
FIG. 8A is a diagram illustrating a structure of a radio frame with control and data channels for use in an LTE system according to an embodiment of the present disclosure.

FIG. 8A is a diagram illustrating a structure of a radio frame with control and data channels for use in an LTE system according to an embodiment of the present disclosure. A radio frame 811 consists of 10 subframes. A subframe 812 spans 1 ms and consists of two slots (slot 0 and slot 1). The control channel is placed at the beginning of each subframe.

Referring to FIG. 8A, the reference number 813 denotes a region for PDCCH as a control channel. A control channel signal is mapped to the first L OFDM symbols in the subframe.

In the present disclosure, the eNB may generate the control information and transmit the control signal through the PDCCH. Meanwhile, an enhanced PDCCH (ePDCCH) may be mapped to a data channel region for transmitting control information. Accordingly, the eNB may transmit the control information through the data channel. It may also be possible for the eNB to transmit the control information through a physical broadcast channel (PBCH) located in the data channel region. It may also be possible for the eNB to transmit the control information using a channel defined separately for transmitting the channel occupancy time information. An embodiment of the present disclosure is directed to the case where the eNB transmits the control information in the PDCCH region.

Referring to FIG. 7, if the control information is received, at operation S730 the UE may identify the channel occupancy information contained in the control information.

The first control information may include information on the resources for the eNB to transmit data to the first UE. The first control information may include downlink and/or uplink transmission time over the unlicensed frequency band in the corresponding area. The first control information may also include integrated unlicensed frequency occupancy information for all UEs at the corresponding time point.

At operation 730, the first UE may identify at least one of resource allocation information for the first UE, integrated unlicensed frequency occupancy information for all UEs at the corresponding time point, and information on the time for transmission over the unlicensed frequency in the corresponding area.

The first control information may be transmitted in units of a subframe and may include the information about the resources allocated in the subframes following the first subframe as well as the subframe carrying the first control information. A detailed description thereof is made hereinafter with reference to FIG. 8B.

FIG. 8B is a diagram illustrating a structure of a radio frame for explaining control information carried in units of a subframe according to an embodiment of the present disclosure.

Referring to FIG. 8B, a radio frame 821 consists of 10 subframes including subframes 822, 823, and 824, and a subframe consists of two slots of 0.5 ms each as denoted by reference number 825. A slot consists of 6 or 7 OFDM symbols. The eNB may transmit the first control information through the PDCCH in each subframe, and the first control information may include the information on the resources allocated to the respective UEs in the subframes.

The first control information may include the information on the resources allocated in plural subframes. For example, if the first control information is received through the PDCCH within the subframe 1 822, it may include the information on the resources allocated to the UE in the subframe 1 822. The first control information may also include the information on the resources allocated to the UE in the subframe 2 823 and/or the subframe 3 824 as well as the subframe 1 822.

The first control information may include the information on the resources allocated in the subframes following the subframe carrying the first control information. For example, if the first control information is received through PDCCH within the subframe 1 822, it may include the information on the resources allocated in the subframe 2 823 rather than the subframe 1 822.

If the eNB transmits the control information through a PDCCH, only the designated UEs can decode the control information to identify the channel occupancy information. In the present disclosure, only the first UE allocated the radio resources, for use at the time when the eNB transmits the first control information, can identify the control information.

Accordingly, other UEs which have no radio resource allocated for use at the time when the eNB transmits the control information cannot decode the control information to identify the channel occupancy information.

In an embodiment, all LAA UEs having an LAA module and/or an LTE module may receive and decode the control information. In order for all of the LAA UEs having at least one of the LAA and LTE modules to receive and decode the control information, a new type of radio network temporary identifier (RNTI) called LAA-RNTI may be defined.

In detail, the eNB may generate the control information with the LAA-RNTI and map the control information to a common search space of the PDCCH. Accordingly, an LAA communication-enabled UE may decode the control information with the LAA-RNTI to identify the channel occupancy information.

Even when the control information is generated with the LAA-RNTI, WLAN UEs cannot identify the channel occupancy information.

After identifying the channel occupancy information from the first control information, at operation S740 (shown in FIG. 7) the UE may generate second control information including the channel occupancy information to the second UE.

The second control information may be the information to be transmitted to a UE operating in the unlicensed frequency band, and this embodiment is directed to a case where the information is carried in a CTS packet. However, the present disclosure is not limited to this embodiment, and of course it may be applicable to any case of using various types of packets including an RTS packet and a data packet being transmitted using a WLAN protocol.

In detail, the UE may generate a CTS packet with a field containing the channel occupancy information in the operation of generating the second control information. Hereinafter, a description is made in detail of the structure of the second control information with reference to FIG. 9.

Figure 9:
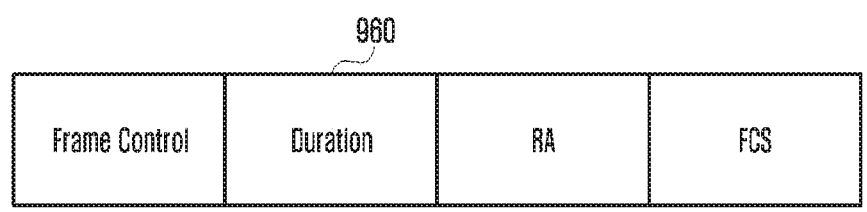
FIG. 9 is a diagram illustrating a frame structure of the second control information containing the channel occupancy time according to an embodiment of the present disclosure.

FIG. 9 is a diagram illustrating a frame structure of the second control information containing the channel occupancy time according to an embodiment of the present disclosure.

Referring to FIG. 9, the second control information may include a duration field. The first UE may generate the second control information with the duration field 960 containing the channel occupancy time carried in the first control information. The first UE may transmit the second control information to the second UE. If a packet carrying the second control information is received, the second UE may identify the channel occupancy time based on the information contained in the duration field 960 of the second control information.

Referring to FIG. 7, after generating the second control information, the first UE may transmit the second control information to the second UE at operation S750. The first UE may transmit the second control information at a second control information transmission start time determined in consideration of the size of the second control information and propagation time and delay. A detailed description thereof is made hereinafter.

The scheduling information carried in the first control information may include information on downlink transmission frequency in the subframe allocated for data transmission, data transmission start time, data transmission end time, and data transmission period.

For example, the first control information may include a data transmission start time (e.g., 200 µs after receipt of the first control information) and a data transmission period (e.g., 100 µs). The first control information may also include a data transmission start time (e.g., 200 µs after receipt of the first control information) and a data transmission end time (e.g., 300 µs after the receipt of the first control information). The first UE may determine the data transmission period (i.e., 100 µs) based on the data transmission start and end times contained in the first control information.

If the channel occupancy time is 10 µs, the first UE may generate the second control information including the channel occupancy time of 100 µs.

The first UE may determine a second control information transmission start time by subtracting an estimated second control information (CTS packet in this embodiment) propagation time and a delay time from the data transmission start time. That is, the first UE may calculate the second control information transmission start time by 200 µs−(estimated CTS packet propagation time+short interframe space (SIFS)).

The estimated CTS packet propagation time may vary depending on the channel condition. Typically, the CTS packet is 14 bytes in WLAN systems. Since the CTS packet transmission rate is changed according to the channel condition, the estimated CTS packet propagation time is likely to vary. For example, the CTS packet propagation time may be expected to be about 4.67 µs at the transmission rate of 24 Mbps and 112 µs at the transmission rate of 1 Mbps. The channel condition may be measured by the WLAN module of the UE, and the UE may estimate the CTS packet propagation time based on the measured channel condition.

The UE may send the estimated CTS packet propagation time to a management module.

The first UE may be configured to transmit the CTS packet at a predetermined transmission rate. For example, if the CTS packet transmission rate is set to 2 Mbps, the estimated CTS packet propagation time for a 14-byte CTS packet is 9.34 us.

The delay (≈SIFS) may be equivalent to SIFS of a WLAN system. The SIFS value of the WLAN system may vary depending on the version of the IEEE 802.11 standard as shown in Table 2.

TABLE 2

| | |
|---|---|
| 802.11a, 802.11g, 802.11n, 802.11ac | 16 µs |
| 802.11b | 10 µs |

Accordingly, if the CTS packet transmission rate is set to 12 Mbps and the SIFS is 16 µs, the first UE may transmit the second control information (200−(9.34+16)) µs after the receipt of the first control information.

In an embodiment, the management module of the first UE may adjust the delay depending on the LAA system. If it is determined that the data transmission start time is shorter than (CTS packet propagation time+SIFS) after the receipt of the first control information, it may be possible to set the delay to a value less than SIFS.

If it is determined that the data transmission start time included in the first control information is shorter than the estimated CTS packet propagation time, i.e., if it is impossible transmit the CTS packet before receipt of data, the first UE may determine to skip transmitting the CTS packet.

Upon receipt of the second control information, the second UE may stop the channel sensing operation during the channel occupancy time indicated by the second control information.

Although the description is directed to the case of using a CTS packet, the present disclosure is applicable to a case where the channel occupancy information is carried in an RTS packet or a data packet transmitted from the first UE to the second UE. It may also be possible for the first UE to generate and transmit another type of control information containing the channel occupancy information to the second UE. The first UE may also broadcast the channel occupancy information for other UEs.

Figure 10:
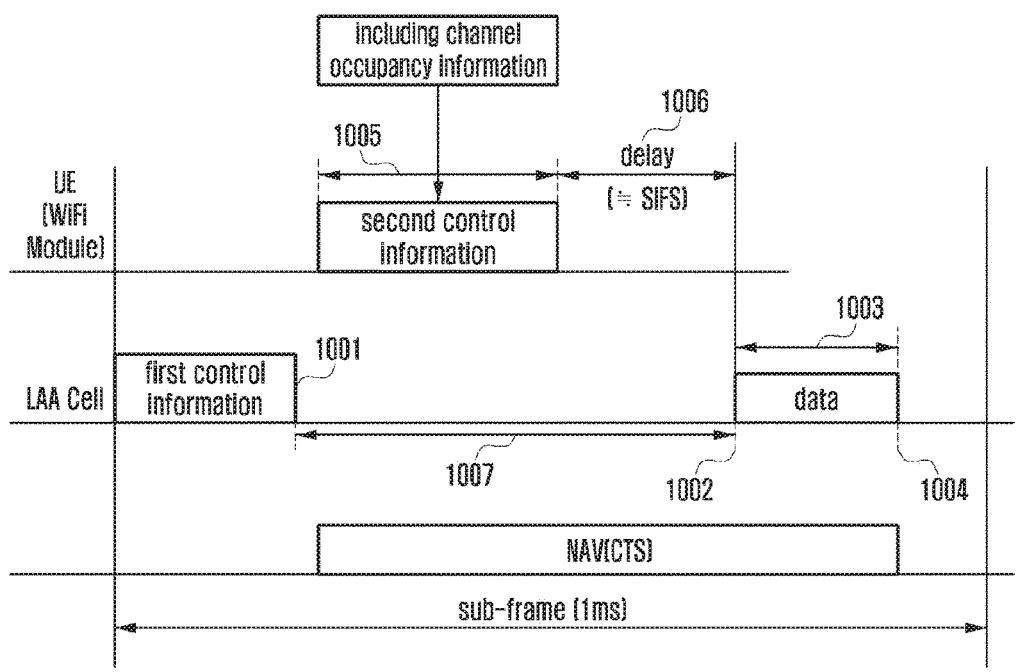
FIG. 10 is a diagram illustrating a method for a UE to transmit second control information according to an embodiment of the present disclosure.

FIG. 10 is a diagram illustrating a method for a UE to transmit second control information according to an embodiment of the present disclosure.

Although this embodiment is directed to a case where the second control information is carrier in a CTS packet, the present disclosure is not limited thereto.

Referring to FIG. 10, an eNB may transmit first control information 1001 to a UE through an LAA cell. The first control information may include channel occupancy information. The first control information may also include information indicating a data transmission start time 1002, a data transmission period 1003, and a data transmission end time 1004.

The first UE may determine a second control information transmission start time based on the information. In detail, the first UE may determine the second control information transmission start time by subtracting a CTS packet propagation time and delay from the data transmission start time 1002.

It is assumed that the data transmission start time 1002 is 200 µs and the transmission rate of the second control information is 12 Mbps. The data transmission start time

1002 may be a time point when the data transmission starts after the receipt of the first control information or equivalent to a time point when a data transmission waiting time (delay time) 1007 ends.

It is assumed that a second control information propagation time 1005 is 9.34 µs for the CTS packet transmission rate of 12 Mbps and a delay time 1006 is 16 µs according to Table 2.

Accordingly, the second control information transmission start time is calculated by 200−(9.34+16), and the UE may transmit the second control information including the channel occupancy information 174.66 µs after the receipt of the first control information.

Figure 11:
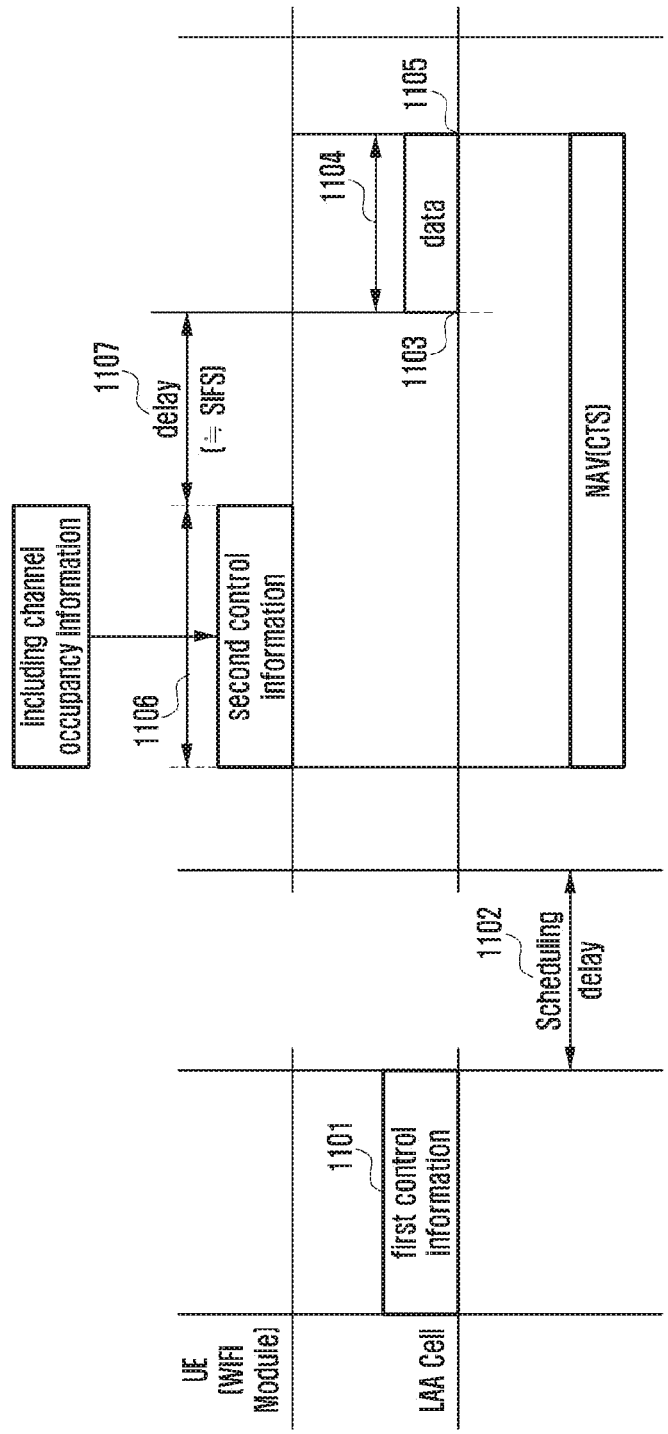
FIG. 11 is a diagram illustrating a method for a UE to transmit second control information according to another embodiment of the present disclosure.

FIG. 11 is a diagram illustrating a method for a UE to transmit second control information according to another embodiment of the present disclosure.

The embodiment of FIG. 11 is directed to a method for transmitting the second control information when the first control information includes the information on the resources allocated in a subframe following the subframe carrying the first control information.

Referring to FIG. 11, an eNB may transmit first control information 1101 to a UE through an LAA cell. The first control information may include channel occupancy information. The first control information may also include information indicating a data transmission start time 1103 in the subframe following the subframe carrying the first control information, a data transmission period 1104, and a data transmission end time 1105. The first control information may also include information on the scheduling delay 1102 required for receiving the corresponding subframe after the receipt of the first control information.

The first UE may determine the second control information transmission start time based on the first control information. In detail, the first UE may determine the second control information transmission start time by subtracting a CTS packet propagation time and a delay time from the data transmission start time 1103.

It is assumed that the data transmission start time 1103 is 200 µs and the transmission rate of the second control information is 12 Mbps. The data transmission start time 1103 may be a time point when data transmission starts after the end of a scheduling delay 1102.

Assuming that the second control information propagation time 1106 is 9.34 µs for the CTS packet transmission rate of 12 Mbps and a delay time (data transmission waiting time) 1107 is 16 µs according to Table 2, the second control information transmission start time 1106 may be calculated by adding (200−(9.34+16)) µs to the scheduling delay.

Accordingly, the UE may transmit the second control information including the channel occupancy information at the time determined by adding 174.66 µs to the scheduling delay after the receipt of the first control information.

Figure 12:
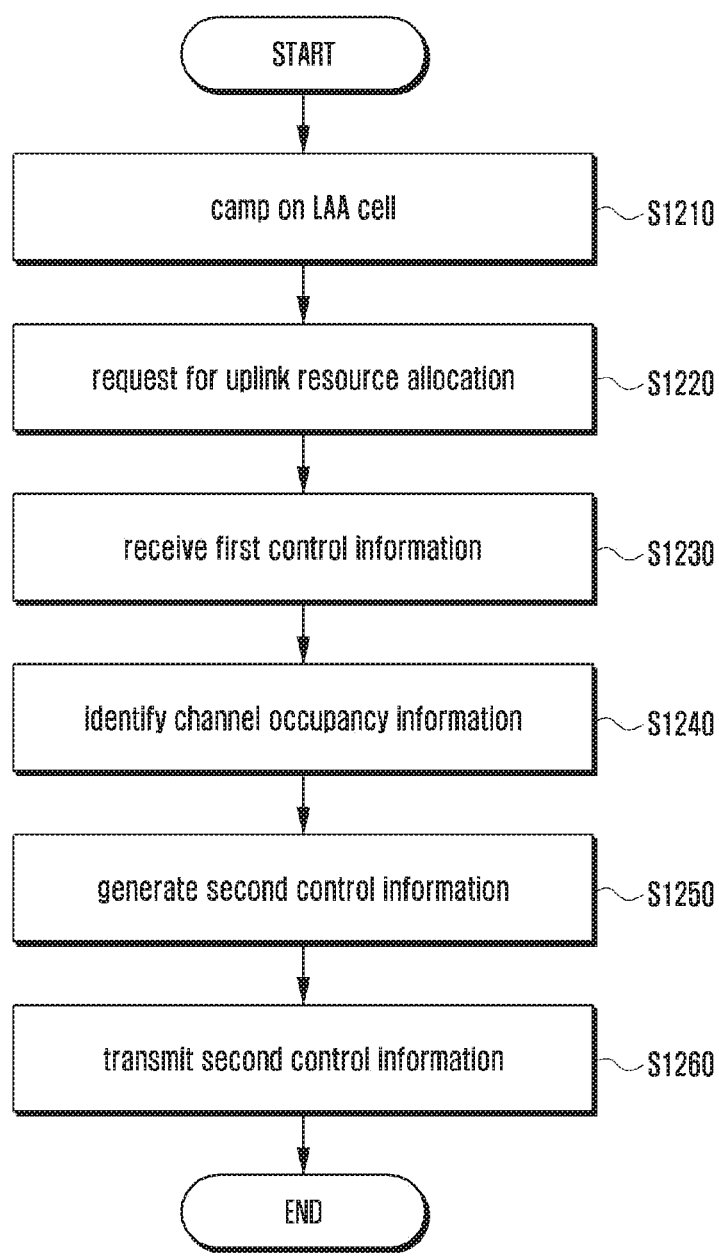
FIG. 12 is a flowchart illustrating a control information transmission procedure of a UE according to an embodiment of the present disclosure.

FIG. 12 is a flowchart illustrating a control information transmission procedure of a UE according to an embodiment of the present disclosure.

Referring to FIG. 12 is directed to a control information transmission method in which a UE receives control information including resource allocation information for uplink data transmission, identifies channel occupancy information contained in the control information, and transmits the channel occupancy information to other UEs.

Referring to FIG. 12, the UE may camp on an LAA cell at operation S1210.

An LAA system is the system capable of supporting carrier aggregation across licensed and unlicensed bands to improve frequency utilization efficiency and downlink throughput, and an LAA cell can be used as a secondary cell (SCell). That is, the UE may configure the LAA cell as an SCell.

A description is made hereinafter of the procedure for a UE to camp on a cell.

A UE camped on a primary cell (PCell) may transmit UE capability information to an eNB through the PCell. The UE capability information may include CA combinations available for the UE. The available CA combinations may include combinations of LAA frequency bands (i.e., LAA combinations). Accordingly, if the UE capability information is received, the eNB may select a compatible SCell to be configured in addition to the PCell based on the frequency band combinations and transmit the information on the SCell information to the UE. If the SCell information is received, the UE may camp on the SCell indicated by the SCell information while maintaining the camp-on state to the PCell.

Also, the SCell information may include information on the frequency of the SCell and it may be expressed as shown in Table 1.

After configuring the LAA as an SCell, the UE may change the setting of a WLAN module of the UE based on the frequency information of the SCell. The UE may change the SCell frequency information for a WLAN frequency information such that the WLAN module operates on the WLAN frequency based on the changed frequency information.

For example, if the LAA module and the WLAN module of the UE use one antenna, the antenna may be configured to operate on the frequency of the LAA cell to camp on the LAA cell and, in this case, it is not necessary for the UE to change the setting of the WLAN module. Otherwise, if the LAA module and the WLAN module use respective antennas, the UE may change the frequency configuration of the antenna in use by the WLAN module according to the frequency information of the LAA cell SCell. Alternatively, the UE may configure the front-end of the WLAN module according to the frequency information of the LAA cell. If there is data to transmit by means of the WLAN module, the UE may configure the antenna and front-end of the WLAN module regardless of the frequency information of the LAA cell.

If the UE has data to transmit to the eNB, at operation S1220 it may request for uplink resource allocation for uplink data transmission.

Upon receipt of the uplink resource allocation request, at operation S1230 the eNB may transmit to the UE the first control information including uplink scheduling information in response to the request. The first control information may be a DCI containing uplink scheduling information. In the case of using DCI, the eNB may configure the DCI in a predefined DCI format having a field containing the channel occupancy information. It may also be possible to define a new field for indicating the channel occupancy information in a predetermined DCI format for use by the eNB.

The UE may receive the first control information through a control channel, a data channel, or a separately defined channel, and this embodiment is directed to a case of receiving the first control information through PDCCH.

Upon receipt of the first control information, at operation S1240 the UE may identify the channel occupancy information contained in the first control information.

The first control information may include the information on the resources allocated to the first UE for transmitting data to the eNB. The first control information may include downlink and/or uplink transmission time over the unlicensed frequency band in the corresponding area. The first control information may also include integrated unlicensed frequency occupancy information for all UEs at the corresponding time point.

The first UE may identify at least one of resource allocation information for the first UE, integrated unlicensed frequency occupancy information for all UEs at the corresponding time point, and information on the time for transmission over the unlicensed frequency in the corresponding area.

The first control information may be transmitted in units of a subframe and include scheduling information indicating resources in the subframe 4 ms (4 subframes) after the subframe carrying the first control information. The first UE may transmit data in the subframe indicated by the scheduling information.

The first control information may include scheduling information for allocating resources in at least one subframe. If the control information includes scheduling information for allocating resources in plural subframes, the first UE may identify available subframes through an LBT process. The first UE may transmit data to the eNB using the available subframes. If the available subframes are identified through the LBT process, the UE may transmit the second control information to at least one of the second and third UEs before transmitting the data to the eNB.

If the eNB transmits the control information through a PDCCH, only the designated UEs can decode the control information to identify the channel occupancy information. In the present disclosure, only the first UE allocated the radio resources, for use at the time when the eNB transmits the first control information, can identify the control information.

Accordingly, other UEs that have no radio resource allocated for use at the time when the eNB transmits the control information cannot decode the control information to identify the channel occupancy information.

In an embodiment, all LAA UEs having an LAA module and/or an LTE module may receive and decode the control information. In order for all of the LAA UEs having at least one of the LAA and LTE modules to receive and decode the control information, a new type of radio network temporary identifier (RNTI) called LAA-RNTI may be defined.

In detail, the eNB may generate the control information with the LAA-RNTI, and the UE may decode the control information with the LAA-RNTI to identify the channel occupancy information.

Even when the control information is generated with the LAA-RNTI, WLAN UEs cannot identify the channel occupancy information.

After identifying the channel occupancy information, at operation S1250 the UE may generate second control information including the channel occupancy information to the second UE.

The second control information may be the information to be transmitted to a UE operating in the unlicensed frequency band, and this embodiment is directed to a case where the information is carried in a CTS packet. However, the present disclosure is not limited to this embodiment, and of course it may be applicable to any case of using various types of packets including an RTS packet and a data packet being transmitted using a WLAN protocol.

The first UE transmits the second control information to the second UE at operation S1260. The first UE may determine the second control information transmission start time based on the scheduling information contained in the first control information and transmit the second control information at the transmission start time. A detailed description thereof is made hereinafter.

The scheduling information contained in the first control information may include information on uplink transmission frequency in the subframe allocated for data transmission, data transmission start time, data transmission end time, and data transmission period.

For example, the first control information may include information on at least one of a subframe allocated for data transmission, a data transmission start time (e.g., 200 μs after the start of a subframe allocated for data transmission) and a data transmission end time (e.g., 300 μs after the start of a subframe allocated for data transmission), and a data transmission period (i.e., 100 μs).

Here, the subframe allocated for data transmission may be a subframe carrying the first control information or a subframe after a predetermined number of subframes after the receipt of the first control information.

If the first control information includes the data transmission start time and the data transmission end time, the first UE may determine the data transmission period, i.e., channel occupancy time (100 us) based on the data transmission start and end times included in the first control information.

If the channel occupancy time is 100 us, the first UE may generate the second control information including the channel occupancy time of 100 us.

The first UE may determine the second control information transmission start time by subtracting an estimated second control information (CTS packet in this embodiment) propagation time and a delay time from the data transmission start time. If the subframe arriving 4 ms after the receipt of the control information is allocated for data transmission, the first UE may calculate the second control information transmission start time by 4 ms+200 μs−(estimated CTS packet propagation time+SIFS).

The estimated CTS packet propagation time may vary depending on the channel condition. Typically, the CTS packet is 14 bytes and, as the CTS packet transmission rate is changed according to the channel condition, the estimated CTS packet propagation time is likely to vary. For example, the CTS packet propagation time may be expected to be about 4.67 μs at the transmission rate of 24 Mbps and 112 μs at the transmission rate of 1 Mbps. The channel condition may be measured by the WLAN module of the UE, and the UE may estimate the CTS packet propagation time based on the measured channel condition.

The first UE may be configured to transmit the CTS packet at a predetermined transmission rate. For example, if the CTS packet transmission rate is set to 2 Mbps, the estimated CTS packet propagation time for a 14-byte CTS packet is 9.34 us.

The delay (≈SIFS) may be equivalent to SIFS of a WLAN system. The SIFS value of the WLAN system may vary depending on the version of the IEEE 802.11 standard as shown in Table 2.

Accordingly, if the CTS packet transmission rate is set to 12 Mbps and the SIFS is 16 μs as specified in IEEE 802.11ac, the first UE may transmit the second control information 4 ms+(200−(9.34+16)) μs after the receipt of the first control information.

In an embodiment, the management module of the first UE may adjust the delay depending on the LAA system. If it is determined that the data transmission start time is shorter than (CTS packet propagation time+SIFS) after the receipt of the first control information, it may be possible to set the delay to a value less than SIFS.

If it is determined that the data transmission start time included in the first control information is shorter than the estimated CTS packet propagation time, i.e., if it is impossible transmit the CTS packet before receipt of data, the first UE may determine to skip transmitting the CTS packet.

Upon receipt of the second control information, the second UE may stop the channel sensing operation during the channel occupancy time indicated by the second control information.

Although the description is directed to the case of using the CTS packet, the present disclosure is applicable to a case where the channel occupancy information is carried in an RTS packet or a data packet transmitted from the first UE to the second UE. It may also be possible for the first UE to generate and transmit another type of control information containing the channel occupancy information to the second UE. The first UE may also broadcast the channel occupancy information for other UEs.

Figure 13:
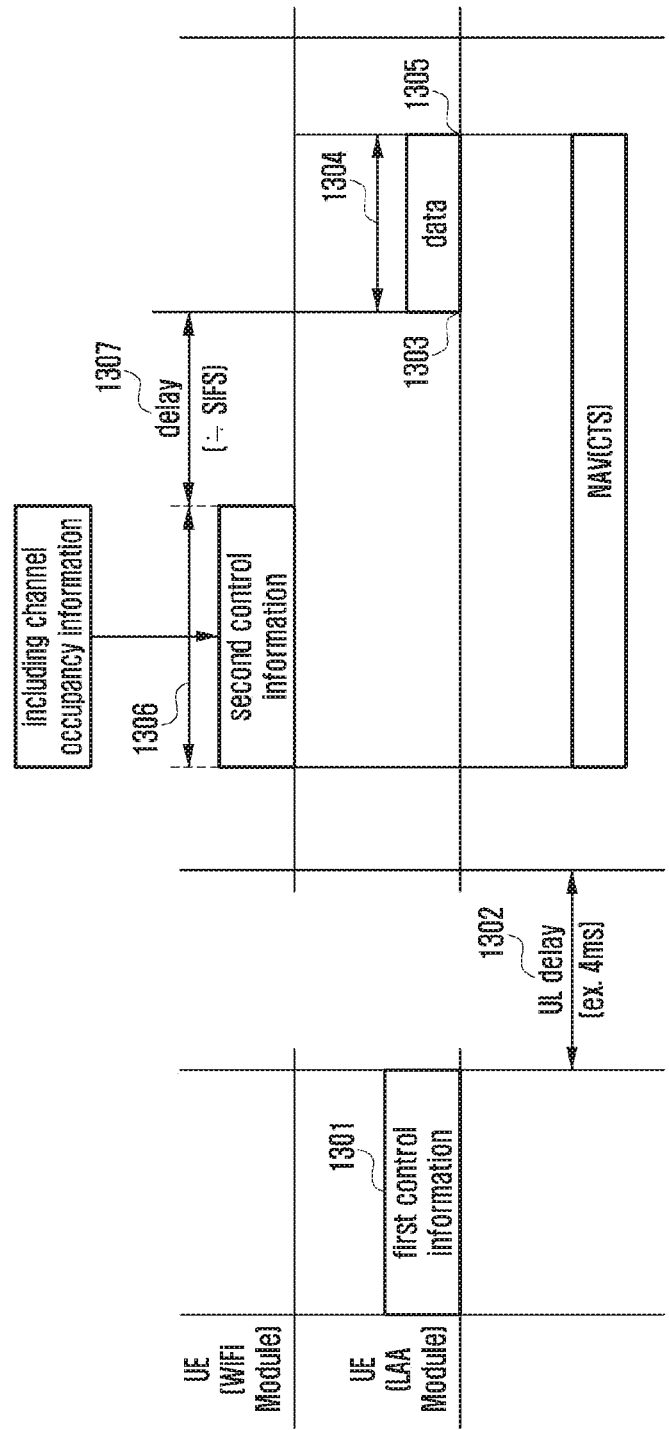
FIG. 13 is a diagram illustrating a method for a UE to transmit second control information according to another embodiment of the present disclosure.

FIG. 13 is a diagram illustrating a method for a UE to transmit second control information according to another embodiment of the present disclosure.

Referring to FIG. 13, an eNB may transmit first control information 1301 to a UE through an LAA cell. The first control information may include channel occupancy information. The first control information may also include information indicating a data transmission start time 1303 in the subframe following the subframe carrying the first control information, a data transmission period 1304, and a data transmission end time 1305. As described above, data transmission start time 1303, the data transmission period 1304, and the data transmission end time 1305 may be associated with the subframe carrying the first control information or a subframe a predetermined number of subframes after the subframe carrying the first control information.

In the case that the first control information is associated with the subframe a predetermined number of subframes after the subframe carrying the first control information, it may further include information on uplink (UL) delay time 1302.

The first UE may determine the second control information transmission start time based on the above information. In detail, the first UE may determine the second control information transmission start time by subtracting an estimated CTS packet propagation time and a delay time from the data transmission start time 1303.

It is assumed that the data transmission start time 1303 is 200 μs and the transmission rate of the second control information is 12 Mbps. The data transmission start time 1303 may be a time point when the data transmission starts after the end of an uplink (UL) delay time 1302.

Assuming that the second control information propagation time 1306 is 9.34 μs for the CTS packet transmission rate of 12 Mbps and a delay time 1307 is 16 μs according to Table 2, the second control information transmission start time may be calculated by adding (200−(9.34+16)) μs to the UL delay.

Accordingly, the UE may transmit the second control information including the channel occupancy information at the time determined by adding 174.66 μs to the scheduling delay after the receipt of the first control information.

Figure 14:
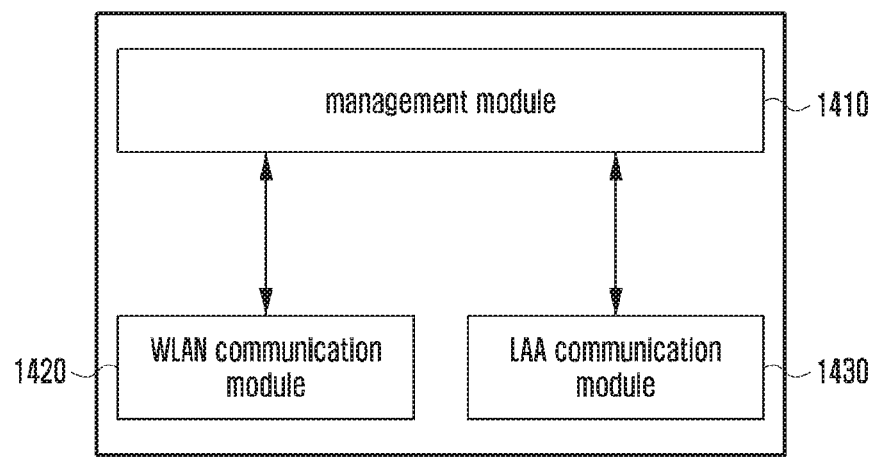
FIG. 14 is a block diagram illustrating a configuration of a UE according to an embodiment of the present disclosure.

FIG. 14 is a block diagram illustrating a configuration of a UE according to an embodiment of the present disclosure.

Referring to FIG. 14, the UE may include a management module 1410, a WLAN communication module 1420, and an LAA communication module 1430. In the embodiment of FIG. 14, the management module 1410, the WLAN communication module 1420, and the LAA communication module 1430 are integrated in a single chipset. In this case, the WLAN communication module 1420 and the LAA communication module 1430 are connected through a universal asynchronous receiver/transmitter (UART) interface, a serial peripheral interface (SPI), or a peripheral component interconnect express (PCIE) interface.

The WLAN communication module 1420 may perform radio communication with a WLAN AP or a WLAN Station to receive control information. The WLAN communication module 1420 may receive the control information through RTS and CTS packets. The WLAN communication module 1420 may also identify a channel condition and sends channel status information to the management module 1410. The WLAN communication module 1420 may also transmit the control information (e.g., CTS packet) generated by the management module 1410 to another UE.

The LAA communication module 1430 may perform radio communication with an eNB to receive first control information. The LAA communication module 1430 may decode the first control information with a radio identifier to identify channel occupancy information.

The LAA communication module 1430 may decode the first control information with an LAA radio identifier as a newly defined parameter. The LAA radio identifier may be defined for all LAA UEs and, if the eNB scrambles the first control information with the LAA radio identifier, all of the LAA UEs capable of communicating with the eNB can received and decode the first control information. Accordingly, the LAA communication module 1430 may identify the channel occupancy information contained in the first control information and send the channel occupancy information to the management module 1410. The LAA communication module 1430 may also transmit to the management module 1410 other information obtained by decoding the first control information.

The LAA communication module 1430 may transmit the first control information to the management module 1410 such that the management module 1410 decodes the first control information to identify the channel occupancy information.

The management module 1410 may share the acquired information with the WLAN communication module 1420 and the LAA communication module 1430 or control the operations of the WLAN communication module 1420 and the LAA communication module 1430.

The management module 1410 may also generate the second control information to be transmitted through a WLAN protocol using the channel occupancy information acquired from the LAA communication module 1430. For example, the management module 1410 may generate a CTS packet including the channel occupancy information.

The management module 1410 may also transmit the second control information to another UE by means of the WLAN communication module 1420. The management module 1410 may determine a second control information transmission start time based on the scheduling information included in the first control information received by the LAA communication module 1430 and transmit the second control information at the determined transmission start time. In detail, the management module 1410 may transmit the second control information to other UEs at a time determined by subtracting a second control information propagation time and a delay time from a data transmission start time.

The management module 1410 may also control the operation of the WLAN communication module 1420 and the LAA communication module 1430. In detail, if the channel occupancy information is received from the LAA communication module 1430, the management module 1410 may control the operation of the WLAN communication module 1420 based on the channel occupancy time included in the channel occupancy information.

If the UE has uplink data to transmit to the eNB, the management module 1410 may transmit an uplink resource allocation request to the eNB by means of the LAA communication module 1430.

If the control information received by the LAA communication module 1430 includes uplink scheduling information for plural subframes, the management module 1410 may perform an LBT process to determine subframes for data transmission.

Figure 15:
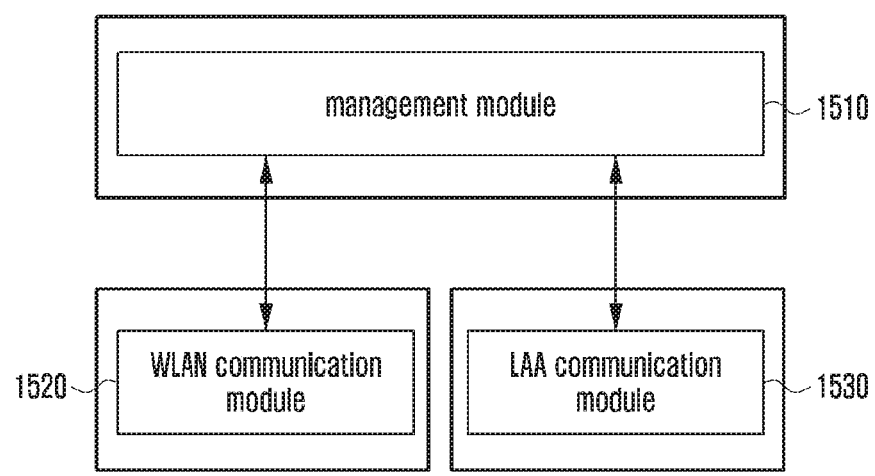
FIG. 15 is a block diagram illustrating a configuration of a UE according to another embodiment of the present disclosure.

FIG. 15 is a block diagram illustrating a configuration of a UE according to another embodiment of the present disclosure.

Referring to FIG. 15, the UE includes a management module 1510, a WLAN communication module 1520, and an LAA communication module 1530. In the embodiment of FIG. 15, the management module 1510, the WLAN communication module 1520, and the LAA communication module 1530 are implemented in separate chipsets. The WLAN communication module 1520 and the LAA communication module 1530 may be connected through a UART interface, an SPI, or a PCIE interface.

The WLAN communication module 1520 may perform radio communication with a WLAN AP or a WLAN Station to receive control information. The WLAN communication module 1520 may receive an RTS packet or a CTS packet containing the control information. The WLAN communication module 1520 may transmit the control information (e.g., CTS packet) generated by the management module 1510 to other UEs.

Since the WLAN communication module 1520 and the management module 1510 are implemented in different chipsets, a certain communication protocol may be defined between WLAN communication module 1520 and the management module 1510 to exchange the control information.

The LAA communication module 1530 may perform radio communication with the eNB to receive first control information. The LAA communication module 1530 may decode the first control information with a radio identifier to identify channel occupancy information.

The LAA communication module 1530 may decode the first control information with the LAA radio identifier as a newly defined parameter. The LAA radio communication identifier may be defined for use by all LAA UEs and, if the eNB scrambles the first control information with the LAA radio identifier, all of the LAA UEs capable of communicating with the eNB can receive and decode the first control information. Accordingly, the LAA communication module 1530 may identify the channel occupancy information contained in the first control information and transmits the channel occupancy information to the management module 1510. It may be necessary to define a communication protocol between the LAA communication module 1530 and the management module 1510 because the LAA communication module 1530 and the management module 1510 are implemented in different shipsets.

The LAA communication module 1530 may transfer the first control information to the management module 1510 such that the management module 1510 decodes the first control information to identify the channel occupancy information.

The management module 1510 may share the information acquired by the WLAN communication module 1520 and the LAA communication module 1530 and control the operations of the WLAN communication module 1520 and the LAA communication module 1530. It may be necessary to define a communication protocol between the WLAN communication module 1520 and the management module 1510 and between the LAA communication module 1530 and the management module 1510 respectively for sharing information and controlling the operations of the WLAN communication module 1520 and the LAA communication module 1530.

The management module 1510 may generate second control information with the channel occupancy information acquired from the LAA communication module 1530 for transmitting the channel occupancy information using a WLAN protocol.

The management module 1510 may also transmit the second control information to other UEs by means of the WLAN communication module 1520. The management module 1510 may determine a second control information transmission start time based on the scheduling information included in the first control information received from the LAA communication module and transmit the second control information to other UEs at the determined transmission start time. In detail, the management module 1510 may transmit the second control information to other UEs at a time determined by subtracting a second control information propagation time and a delay time from a data transmission start time.

The management module 1510 may also control the operations of the WLAN communication module 1520 and the LAA communication module 1530. If the channel occupancy information is received from the LAA communication module 1530, the management module 1510 may control the operation of the WLAN communication module 1520 based on the channel occupancy time included in the channel occupancy information. That is, the management module 1510 may control the WLAN communication module to transmit the channel occupancy information received from the LAA communication module 1530 to another WLAN UE. The WLAN UE assumes that the corresponding channel is preoccupied during the channel occupancy time indicated in the second control information and performs a predetermined operation. The predetermined operation may be an operation specified in a WLAN communication standard.

If the control information received by the LAA communication module 1530 includes uplink scheduling information associated with a plurality of subframes, the management module 1510 may perform an LBT operation to determine the subframes for data transmission.

Figure 16:
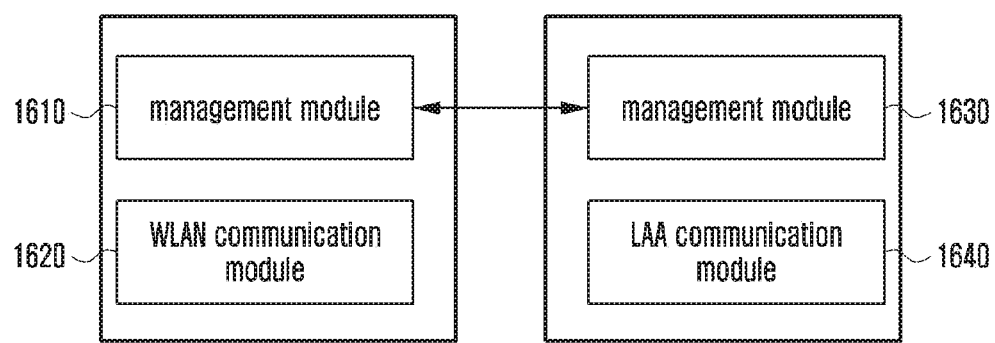
FIG. 16 is a block diagram illustrating a configuration of a UE according to another embodiment of the present disclosure.

FIG. 16 is a block diagram illustrating a configuration of a UE according to another embodiment of the present disclosure.

Referring to FIG. 16, the UE may include a WLAN communication module 1620 and an LAA communication module 1640. In the embodiment of FIG. 16, the WLAN communication module 1620 and the LAA communication module 1640 are implemented in different chipsets which have respective management modules.

The WLAN communication module 1620 may perform radio communication with a WLAN AP or a WLAN Station to receive control information. The WLAN communication module 1620 may receive the control information through RTS and CTS packets. The WLAN communication module 1620 may receive second control information (e.g., CTS packet) from the management module 1610 included in the same chipset and transmit the second control information to other UEs.

The LAA communication module 1640 may perform radio communication with an eNB to receive first control information. The LAA communication module 1640 may decode the first control information with a radio identifier to identify a channel occupancy time.

The LAA communication module 1640 may decode the first control information with an LAA radio identifier as a newly defined parameter. The LAA radio identifier may be defined for all LAA UEs and, if the eNB scrambles the first control information with the LAA radio identifier, all of the LAA UEs capable of communicating with the eNB can received and decode the first control information. Accordingly, the LAA communication module 1640 may identify the channel occupancy information contained in the first control information and send the channel occupancy information to the management module 1630.

The LAA communication module 1640 may transmit the first control information to the management module 1630 in the same chipset such that the management module 1630 decodes the first control information to identify the channel occupancy information.

The management modules 1610 and 1630 may share the information acquired by the WLAN and LAA communication modules 1620 and 1640 to control the operations of the WLAN and LAA communication modules 1620 and 1640.

Each of the management modules 1610 and 1630 may generate the second control information with the channel occupancy information to transmit the channel occupancy information using a WLAN protocol. In detail, the management module 1630 may generate the second control information containing the channel occupancy information received from the LAA communication module 1640 or identified by itself and transmit the second control information to the other management module 1610. Also, the management module 1610 may receive the first control information containing the channel occupancy information from the management module 1630 and generate the second control information containing the channel occupancy information. Each of the management modules 1610 and 1630 may generate a CTS packet having a field containing the channel occupancy information.

The management module 1610 may generate or receive the second control information from the other management module 1630 and transmit the second control information to other UEs by means of the WLAN communication module 1620.

The management module 1610 may determine a second control information transmission start time based on the scheduling information contained in the first control information received by the LAA communication module 1640 and transmit the second control information to other UEs at the determined transmission start time. In detail, the management module 1610 may transmit the second control information to other UEs at the time determined by subtracting a second control information propagation time and a delay time from a data transmission start time.

The second control information transmission start time may be determined by the management module 1630 and transmitted to the other management module 1610.

It may also be possible for the WLAN communication module 1620 to determine the second control information transmission start time autonomously and transmit the second control information at the transmission start time to other UEs.

The second control information transmission start time calculation method has been described above; thus, a detailed description thereof is omitted herein.

The management module 1610 may control the operation of the WLAN communication module 1620. In detail, if the channel occupancy information is received from the LAA communication module 1640, the management module 1610 may control the operation of the WLAN communication module 1620 based on the channel occupancy time contained in the channel occupancy information. That is, the management module 610 may power off the WLAN communication module 1620, turn on a power saving mode, or turn off a channel sensing function.

If the UE has uplink data to transmit to the eNB, the management module 1630 may transmit an uplink resource allocation request to the UE by means of the LAA communication module 1640.

If the control information received by the LAA communication module 1640 includes uplink scheduling information associated with plural subframes, the management module 1630 may perform an LBT operation to determine the subframes for data transmission.

In an embodiment of the present disclosure, both the chipset including the WLAN communication module and the chipset including the LAA communication module may have no management module. That is, a controller (e.g., at least one processor) of the WLAN communication module and a controller (e.g., at least one processor) of the LAA communication module may operate as management modules.

Figure 17:
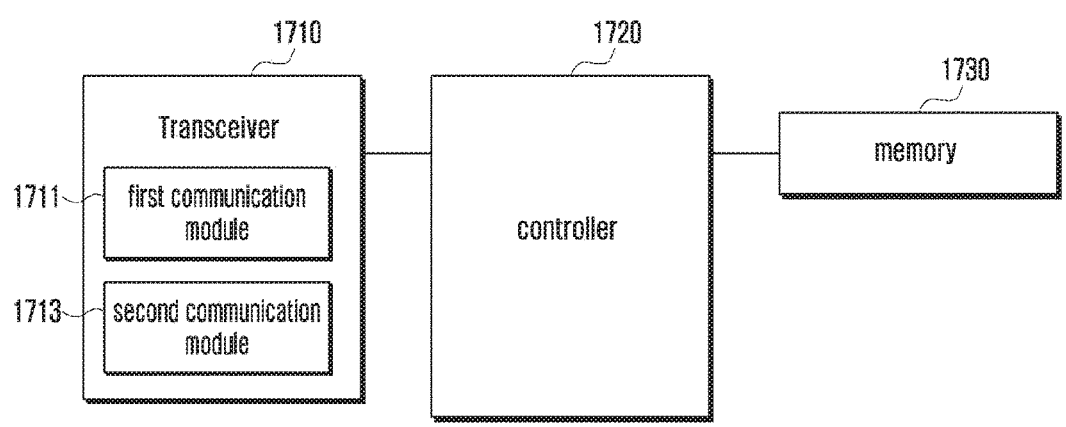
FIG. 17 is a block diagram illustrating a configuration of a UE according to another embodiment of the present disclosure.

FIG. 17 is a block diagram illustrating a configuration of a UE according to another embodiment of the present disclosure.

Referring to FIG. 17, the UE includes a transceiver 1710, a controller (e.g., at least one processor) 1720, and a memory 1730. Hereinafter, the transceiver can be referred to as a communication unit, the controller can be referred to as a control unit, the memory can be referred to as a storage unit. And, for example, when defining a controller in the specification, it may be stated that "the controller may be a circuit, an application-specific integrated circuit or at least one processor" and it may be applied throughout the specification. In this embodiment, the description is directed to a case where the transceiver 1710 includes a first communication module and a second communication module. However, it may also be possible that the first and second communication modules are included in the controller 1720. In this embodiment, it is assumed that the first and second communication modules are a WLAN communication module and an LAA communication module respectively. The WLAN and LAA communication modules may be included in the controller 1720 or the transceiver 1710 in any of the configurations described with reference to FIGS. 14 to 16.

The transceiver 1710 may communicate with a network entity. The transceiver 1710 may receive first control information from an eNB by means of the second communication module (e.g., communication interface) 1713. The transceiver 1710 may receive a radio identifier for use in decoding the first control information. The transceiver 1710 may also transmit second control information generated by the controller 1720 to other UEs.

The controller 1720 may control the transceiver 1710 to receive the first control information from the eNB by means of the first communication module (e.g., communication interface) 1711. The controller 1720 may also decode the control information to identify unlicensed band channel occupancy information. The controller 1720 may decode the control information with a radio identifier received from the eNB or stored in the UE. The controller 1720 may decode the control information with a radio identifier defined for use by all UEs.

The controller 1720 may also generate second control information including the identified channel occupancy information and transmit the second control information to other UEs using a WLAN protocol. The controller 1720 may also control the operation of the second communication module based on the channel occupancy information.

The controller 1720 may also determine a second control information transmission start time based on the scheduling information included in the first control information.

If the UE has uplink data to transmit to the eNB, the controller 1720 may control the first communication module 1711 to transmit an uplink resource allocation request to the eNB.

If the first control information includes uplink scheduling information associated with plural subframes, the controller 1720 may perform an LBT operation to determine the subframes for data transmission.

The memory 1730 may store the radio identifier for use in decoding the control information. The memory 1730 may store the identified channel occupancy information and the second control information generated with the channel occupancy information.

Figure 18:
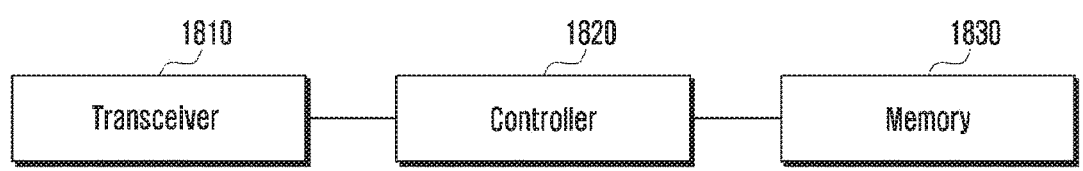
FIG. 18 is a block diagram illustrating a configuration of a wireless local area network (WLAN) communication module according to an embodiment of the present disclosure.

FIG. 18 is a block diagram illustrating a configuration of a WLAN communication module according to an embodiment of the present disclosure.

Referring to FIG. 18, according to an embodiment of the present disclosure, the WLAN communication module may include a transceiver 1810, a controller (e.g., at least one processor) 1820, and a memory 1830.

The transceiver 1810 may communicate with a network entity. The transceiver 1810 may perform radio communication with a WLAN AP or a WLAN Station to receive control information. The transceiver 1810 may receive second control information from a management module.

The controller 1820 may measure a channel condition to generate information for estimating second control information propagation time. The controller 1820 may also control the transceiver 1810 to transmit the second control information to other UEs. The controller 1820 may also determine a second control information transmission start time based on scheduling information included in the first control information.

The memory 1830 may store the second control information received from the management module.

Figure 19:
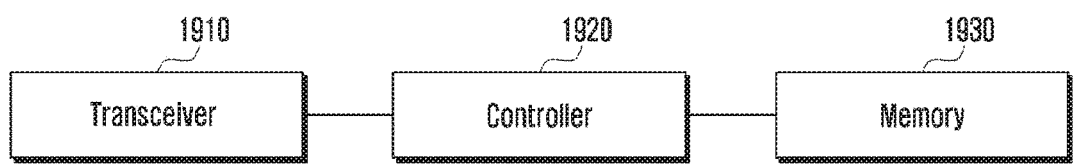
FIG. 19 is a block diagram illustrating a configuration of an LAA communication module according to an embodiment of the present disclosure.

FIG. 19 is a block diagram illustrating a configuration of an LAA communication module according to an embodiment of the present disclosure.

Referring to FIG. 19, according to an embodiment of the present disclosure, the LAA communication module includes a transceiver 1910, a controller (e.g., at least one processor) 1920, and a memory 1930.

The transceiver 1910 may communicate with a network entity. The transceiver 1910 may perform radio communication with an eNB to receive control information. The transceiver 1910 may transmit an uplink resource allocation request to the eNB.

The controller 1920 may identify unlicensed frequency band channel occupancy information contained in the received control information. The controller 1920 may identify the channel occupancy information contained in the control information received through a control channel, a data channel, or a separately defined channel in a subframe. In detail, the controller 1920 may decode the control information with a radio identifier to identify the channel occupancy information. The controller 1920 may decode the control information with an LAA radio identifier defined for use by all UEs to identify the channel occupancy information. The controller 1920 may also control the transceiver 1910 to transmit the channel occupancy information containing the channel occupancy time to a management module.

The memory 1930 may store a radio identifier for use in decoding the control information. The memory 1930 may also store the channel occupancy information acquired from the control information.

Figure 20:
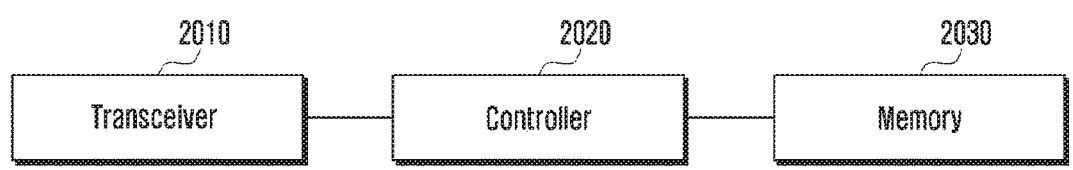
FIG. 20 is a block diagram illustrating a configuration of a management module according to an embodiment of the present disclosure.

FIG. 20 is a block diagram illustrating a configuration of a management module according to an embodiment of the present disclosure.

Referring to FIG. 20, according to an embodiment of the present disclosure, the management module may include a transceiver 2010, a controller (e.g., at least one processor) 2020, and a memory 2030.

The transceiver 2010 may communicate with a network entity. The transceiver 2010 may receive channel occupancy information from an LAA communication module. The transceiver 2010 may also transmit second control information to a WLAN communication module.

The controller 2020 may identify a channel occupancy time based on the channel occupancy information received from the LAA communication module. The controller 2020 may generate the second control information including the channel occupancy information. The controller 2020 may control the WLAN communication to transmit the second control information to other UEs.

The controller 2020 may determine a second control information transmission start time based on scheduling information contained in the first control information received from the eNB and transmit the second control information at the transmission start time.

The controller 2020 may control the operation of the WLAN module based on the channel occupancy information.

The memory 2030 may store the channel occupancy information received from the LAA communication module.

Figure 21:
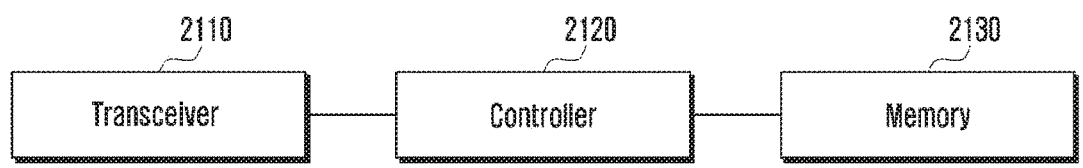
FIG. 21 is a block diagram illustrating a configuration of an evolved node B (eNB) according to an embodiment of the present disclosure.

FIG. 21 is a block diagram illustrating a configuration of an eNB according to an embodiment of the present disclosure.

Referring to FIG. 21, the eNB may include a transceiver 2110, a controller (e.g., at least one processor) 2120, and a memory 2130.

The transceiver 2110 may communicate with a network entity. The transceiver 2110 may transmit control information to a UE and receive data from the UE.

The controller 2120 may identify the scheduling information for LAA-enabled UEs and determine an integrated channel occupancy time for all UEs. The controller 2120 may generate control information with the channel occupancy time and a radio identifier. In detail, the controller 2120 may add a cyclic redundancy check (CRC) to downlink transmission information including the channel occupancy time and generate the control information by scrambling the CRC with the radio identifier. The controller 2120 may also transmit the control information to the UE.

The controller 2120 may also generate the control information with an LAA radio identifier defined for all UEs. The controller 2120 may add a CRC to the downlink transmission information including the channel occupancy time and generate the control information by scrambling the CRC with the LAA radio identifier. The controller 2120 may also transmit the control information to the UE. In the case of using the LAA radio identifier, all LAA UEs can decode the control information to identify the channel occupancy information. At this time, the controller 2120 may transmit to the UE the information related to the LAA radio identifier used for generating the control information.

The memory 2130 may store the information related to the LAA radio identifier. The memory 2130 may also store per-UE scheduling information.

As described above, the channel occupancy notification method and apparatus of the present disclosure is advantageous in terms of facilitating unlicensed band communication of terminals operating on an unlicensed frequency channel by sharing unlicensed band channel occupancy information efficiently.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for controlling information transmission of a first terminal in a first network in a mobile communication system, the method comprising:
   receiving first control information from a base station using a first radio protocol;
   acquiring channel occupancy information based on the first control information;
   generating second control information based on the channel occupancy information; and
   transmitting the second control information to a second terminal in a second network using a second radio protocol,
   wherein the second control information comprises a clear-to-send (CTS) packet including channel occupancy information, and
   wherein the transmitting of the second control information comprises:
      calculating a transmission start time for starting transmission of the second control information based on the first control information, and
      transmitting the second control information at the transmission start time.

2. The method of claim 1,
   wherein the first radio protocol comprises a long-term evolution (LTE) protocol, and
   wherein the second radio protocol comprises a wireless local area network (WLAN) protocol.

3. The method of claim 1,
   wherein the first control information comprises downlink control information (DCI) including the channel occupancy information, and
   wherein the DCI is received through a physical downlink control channel (PDCCH).

4. The method of claim 1, wherein the channel occupancy information includes a channel occupancy time in an unlicensed band.

5. A first terminal for receiving control information in a mobile communication system, the first terminal comprising:
   a first module configured to perform a first communication using a first radio protocol;
   a second module configured to perform a second communication using a second radio protocol; and
   at least one processor configured to:
      receive first control information from a base station using the first radio protocol,
      acquire channel occupancy information based on the first control information,
      generate second control information based on the channel occupancy information, and
      transmit second control information to a second terminal in a second network using the second radio protocol,
   wherein the second control information comprises a clear-to-send (CTS) packet including channel occupancy information, and
   wherein the at least one processor is further configured to:
      calculate a transmission start time for starting transmission of the second control information based on the first control information, and
      transmit the second control information at the transmission start time.

6. The first terminal of claim 5,
   wherein the first radio protocol comprises a long-term evolution (LTE) protocol, and
   wherein the second radio protocol comprises a wireless local area network (WLAN) protocol.

7. The first terminal of claim 5,
   wherein the first control information comprises downlink control information (DCI) including the channel occupancy information, and
   wherein the DCI is received through a physical downlink control channel (PDCCH).

8. The first terminal of claim 5, wherein the channel occupancy information includes a channel occupancy time in an unlicensed band.

* * * * *